United States Patent
Van Buren et al.

(10) Patent No.: US 8,755,399 B1
(45) Date of Patent: Jun. 17, 2014

(54) COMMON-DIRECTION DUPLEXER

(71) Applicant: Wilson Electronics, LLC, St. George, UT (US)

(72) Inventors: Vernon A. Van Buren, Cedar City, UT (US); Christopher K. Ashworth, St. George, UT (US); James W. Wilson, Diamond Valley, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 13/837,125

(22) Filed: Mar. 15, 2013

(51) Int. Cl.
*H04L 12/28* (2006.01)
*H04J 1/16* (2006.01)

(52) U.S. Cl.
USPC ............ 370/430; 370/252; 370/315; 370/419

(58) Field of Classification Search
USPC .................................. 370/252, 419, 430, 315
See application file for complete search history.

(56) References Cited

U.S. PATENT DOCUMENTS

| | | | |
|---|---|---|---|
| 5,208,563 A * | 5/1993 | Russell et al. | 333/109 |
| 7,250,830 B2 | 7/2007 | Layne et al. | |
| 2008/0186106 A1* | 8/2008 | Christian et al. | 333/133 |
| 2011/0261727 A1* | 10/2011 | Han | 370/277 |

OTHER PUBLICATIONS

Office Action mailed Oct. 28, 2013 in U.S. Appl. No. 13/836,928.

\* cited by examiner

*Primary Examiner* — John Pezzlo
(74) *Attorney, Agent, or Firm* — Maschoff Brennan

(57) ABSTRACT

A common-direction duplexer may include a common port, a first-band port, and a second-band port. The common-direction duplexer may also include a first filter between the common port and the first-band port. The first filter may be configured to pass a first frequency range and filter out a second frequency range and a third frequency range. The first and second frequency ranges may be associated with a first-direction signal transmitted in the first and/or second frequency range. The third frequency range may be spectrally between the first and second frequency ranges and may be associated with a second-direction signal that propagates in a direction opposite that of the first-direction signal. The common-direction duplexer may also include a second filter between the common port and the second-band port. The second filter may be configured to pass the second frequency range and filter out the first and third frequency ranges.

12 Claims, 9 Drawing Sheets

COMMON-DIRECTION DUPLEXER

FIELD

The present disclosure relates to a common-direction duplexer.

BACKGROUND

Wireless communications may be used in a wide variety of applications and for a variety of uses. Because of the many uses, portions of a frequency spectrum (commonly referred to as "bands") used for wireless communications may be designated for certain uses to help reduce interference.

Additionally, in a wireless communication system, communication may occur as uplink communications and downlink communications. Uplink communications refer to communications that originate at a wireless communication device (referred to hereinafter as "wireless device") and that are transmitted to an access point (e.g., base station, remote radio head, wireless router, etc.) associated with the wireless communication system. Downlink communications refer to communications from the access point to the wireless device.

Frequency ranges (often referred to as "frequency bands" or "bands") within the frequency spectrum may be designated for use by the wireless communication system. In some instances, a designated band may include an uplink band for uplink communications and a downlink band used for downlink communications. In some instances, the frequency ranges associated with the uplink and downlink bands within the designated band may be separated by a certain degree of frequency spacing referred to as a guard band. The guard band may help reduce interference between signals transmitted in the uplink band and the downlink band.

In some instances, a wireless communication system may be configured to operate in multiple designated frequency bands (e.g., a first communication band and a second communication band) that may each include uplink and downlink bands. In some of these instances, the downlink band associated with the first communication band ("first downlink band") may be spectrally adjacent to the downlink band associated with the second communication band ("second downlink band"), while the uplink bands associated with the first and second communication bands ("first uplink band" and "second uplink band," respectively) may be separated by a guard band, that may include the first and second downlink bands. In other instances, the first uplink band may be spectrally adjacent to the second uplink band, while the first and second downlink bands associated with the first and second communication bands may be separated by a guard band that may include the first and second uplink bands. A wireless communication system configured to operate in the first communication band and the second communication band may experience problems processing wireless communication signals when the uplink bands or the downlink bands of the first and second communication bands are spectrally adjacent and/or the corresponding downlink or uplink bands are not spectrally adjacent.

Additionally, in these or other instances, the guard bands between bands may be substantially narrow. Filtering two bands that may be separated by a narrow guard band (e.g., a guard band less than 30 megahertz) may also be difficult and/or may add cost to systems configured to process the signals.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a common-direction duplexer may include a common port, a first-band port, and a second-band port. The common-direction duplexer may also include a first filter communicatively coupled between the common port and the first-band port. The first filter may be configured to pass a first frequency range and filter out a second frequency range and a third frequency range. The first frequency range and the second frequency range may be associated with a first-direction signal that may be transmitted in at least one of the first frequency range and the second frequency range. The third frequency range may be spectrally between the first frequency range and the second frequency range and may be associated with a second-direction signal that propagates in a direction opposite that of the first-direction signal. The common-direction duplexer may also include a second filter communicatively coupled between the common port and the second-band port. The second filter may be configured to pass the second frequency range and filter out the first frequency range and the third frequency range.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
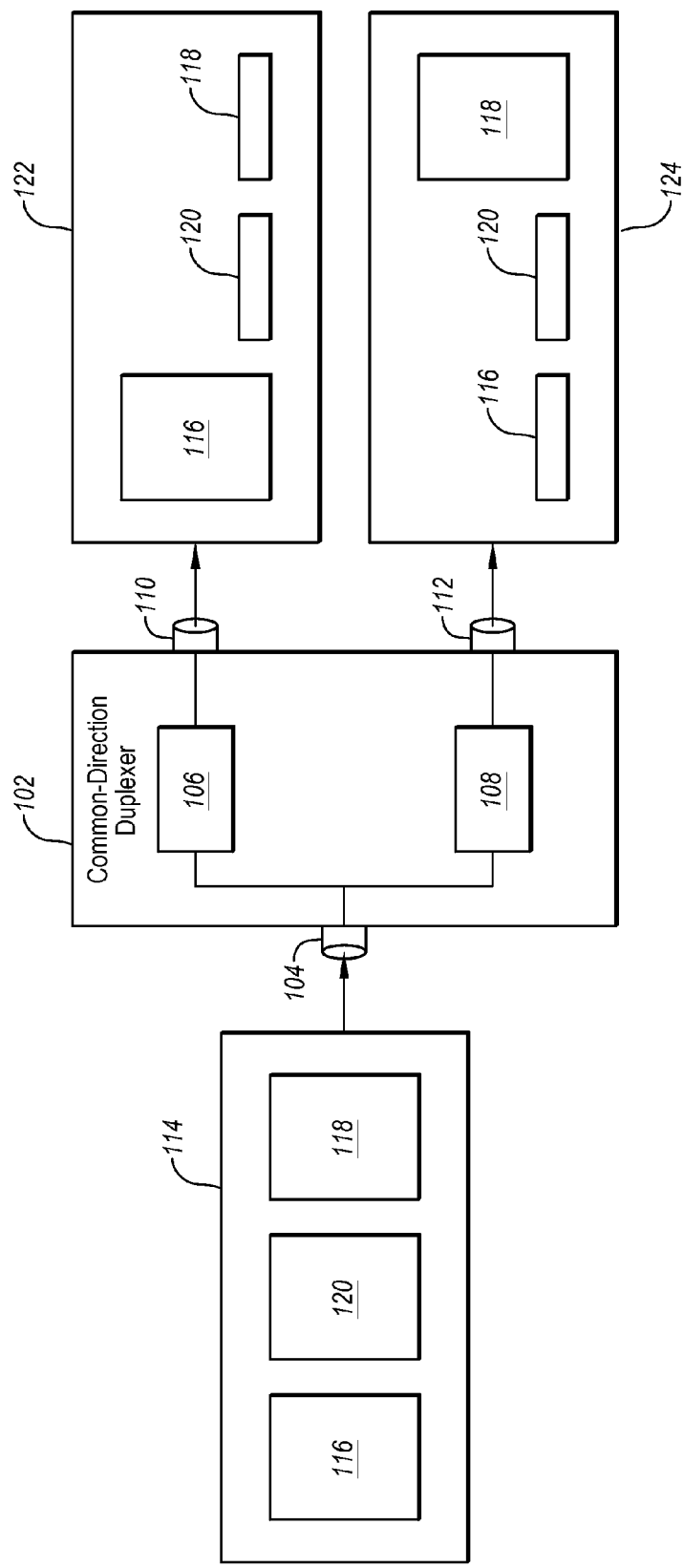
FIGS. 1A and 1B illustrate an example embodiment of a common-direction duplexer.

According to some embodiments, a device may be configured as a common-direction duplexer to facilitate the processing of wireless communications signals by a wireless communication system operating in a first frequency range (referred to hereinafter as "the first communication band") and a second frequency range (referred to hereinafter as "the second communication band"). The term "frequency range" may refer to one or more applicable frequencies within the electromagnetic spectrum and may also be referred to as a "frequency band," a "communication band," or a "band." Further, in some instances a "band," "frequency band," or "communication band" may refer to a contiguous frequency range while in other instances the terms "band," "frequency band," or "communication band" may refer to multiple non-contiguous frequency ranges. Additionally, as indicated above, a "band," "frequency band," or "communication band" may include one or more sub-bands (e.g., a communication band may include an uplink band and a downlink band).

The common-direction duplexer may facilitate processing wireless communication signals in which uplink bands or downlink band of the first communication band and the second communication band are spectrally adjacent and in which the corresponding downlink or uplink bands are separated by a guard band, which in some instances may include the spectrally adjacent bands.

A common-direction duplexer disclosed herein may include a common port, a first-band port, and a second-band port. The common-direction duplexer may also include a first filter communicatively coupled between the common port and the first-band port. The first filter may be configured to pass a first frequency range associated with wireless communications and filter out a second frequency range and a third frequency range associated with the wireless communications. In some embodiments, the first frequency range and the second frequency range may include a first uplink band and a second uplink band, respectively. Additionally, the third frequency range may include a first downlink band and second downlink band and may be spectrally outside of and between the first frequency range and the second frequency range. In other embodiments, the first frequency range and the second frequency range may include a first downlink band and a second downlink band, respectively, and the third frequency range may include a first uplink band and second uplink band and may be spectrally outside of and between the first frequency range and the second frequency range.

The above configuration of a common-direction duplexer may allow for processing wireless communication signals that may operate in the first communication band and/or the second communication band, where uplink or downlink bands associated with the first communication band and the second communication band are separated by a guard band. Additionally, in some embodiments, the common-direction duplexer may be included in a signal booster configured to amplify wireless communication signals (e.g., radio frequency (RF) signals) that may operate in the first communication band and/or in the second communication band, in which uplink bands or downlink bands of the first communication band and the second communication band are spectrally adjacent and/or in which the corresponding downlink or uplink bands are separated by a guard band that may include the spectrally adjacent bands, as explained in further detail below.

Figure 1B:
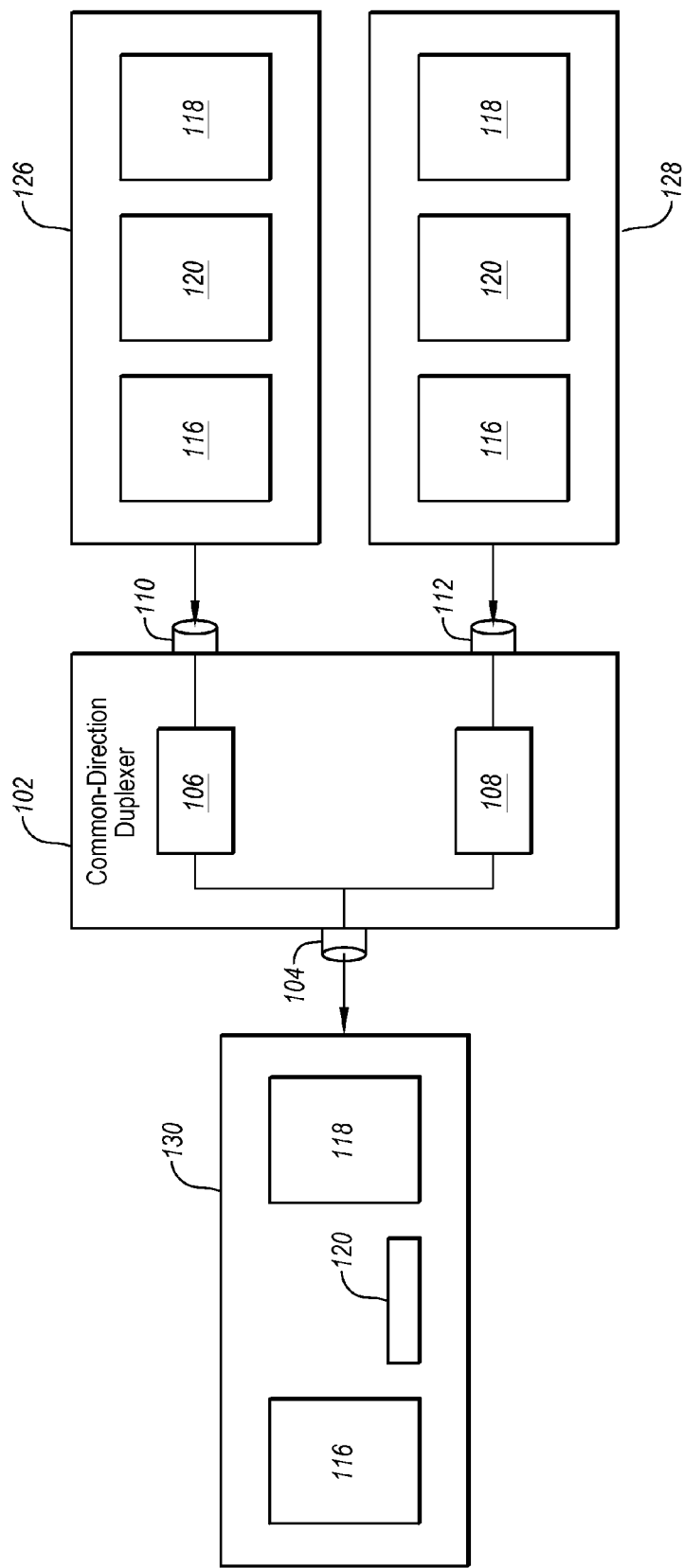

FIGS. 1A and 1B illustrate an example embodiment of a common-direction duplexer 102, arranged in accordance with at least some embodiments described herein. The common-direction duplexer 102 may include a common port 104, a first filter 106, a second filter 108, a first-band port 110, and a second-band port 112. The common port 104 may be any suitable system, apparatus, or device configured to receive, as an input signal, a signal from outside of the common-direction duplexer and communicate the received signal to the first filter 106 and the second filter 108. The common port 104 may also be configured to receive wireless communication signals from at least one of the first filter 106 and the second filter 108 and emit the signals outside of the common-direction duplexer 102.

The first filter 106 may be configured to filter signals received at the first filter 106 based on a first frequency range 116 such that frequencies within the first frequency range 116 may pass through the first filter 106 and frequencies outside of the first frequency range 116 may be substantially filtered out (e.g., substantially attenuated) by the first filter 106. Therefore, the first filter 106 may output signals based on the first frequency range 116, where the output signals may include frequencies of the received signals that are within the first frequency range 116 and where frequencies outside of the first frequency range 116 may be substantially attenuated. In some embodiments, the first frequency range 116 may include a specific band associated with wireless communications, such as an uplink band of a first communication band (referred to hereinafter as "the first uplink band"). The first filter may be implemented using any suitable filtering technology including, but not limited to, surface acoustic wave (SAW) filters, bulk acoustic wave (BAW) filters, and ceramic filters.

The second filter 108 may be configured to filter signals received at the second filter 108 based on a second frequency range 118 such that frequencies within the second frequency range 118 may pass through the second filter 108 and frequencies outside of the second frequency range 118 may be substantially filtered out (e.g., substantially attenuated) by the second filter 108. Therefore, the second filter 108 may output signals based on the second frequency range 118, where the output signals may include frequencies of the received signals that are within the second frequency range 118 and where frequencies outside of the second frequency range 118 may be substantially attenuated. In some embodiments, the second frequency range 118 may include a specific band associated with wireless communications, such as an uplink band of a second communication band (referred to hereinafter as "the second uplink band"). Similar to the first filter, the second filter 108 may be implemented using any suitable filtering technology including, but not limited to, SAW filters, BAW filters, and ceramic filters.

FIG. 1A illustrates operation of the common-direction duplexer 102 with respect to an input signal 114 that may be received at the common port 104, according to some embodiments of the present disclosure. In the illustrated embodiment of FIG. 1A, the input signal 114 is depicted in the frequency domain and may be a wideband signal transmitted in different frequency ranges. For example, in the illustrated embodiment, the input signal 114 may be transmitted in the first frequency range 116, the second frequency range 118, and the third frequency range 120. In some embodiments, the first frequency range 116 may be the first uplink band associated with the first communication band and the second frequency range 118 may be the second uplink band associated with the second communication band discussed above. Additionally, the third frequency range 120 may include a first downlink band (referred to hereinafter as "the first downlink band") and a second downlink band (referred to hereinafter as "the second downlink band") associated with the first communication band and the second communication band, respectively. The first downlink band and the second downlink band may be spectrally adjacent to each other and may be included in the guard band between the first uplink band and the second uplink band.

For example, in a 700 Megahertz (MHz) band plan for commercial services of the Third Generation Partnership Project (3GPP) standard associated with wireless communications (referred to hereinafter as "the 700 MHz band plan"), the twelfth band (referred to hereinafter as "Band 12") of the 700 MHz band plan may include frequencies in the 698-746 MHz range and the thirteenth band (referred to hereinafter as "Band 13") may include frequencies in the 746-787 MHz range. Additionally, the uplink band associated with the Band 12 may include frequencies in the 698-716 MHz range and the downlink band associated with the Band 12 may include frequencies in the 728-746 MHz range. Further, the downlink band associated with the Band 13 may include frequencies in the 746-757 MHz range, and the uplink band associated with the Band 13 may include frequencies in the 776-787 MHz range. Therefore the uplink bands associated with the Band 12 and the Band 13 may be separated by a guard band that includes the downlink bands associated with the Band 12 and the Band 13. Additionally, the downlink bands associated with the Band 12 and the Band 13 may be spectrally adjacent to each other.

Therefore, in one example, the frequency ranges 116, 118, and 120 illustrated in FIG. 1A, may be representative of the different uplink and downlink bands in the Band 12 and the Band 13. For example, in some embodiments, the first frequency range 116 may be representative of the uplink band of the Band 12, the second frequency range 118 may be representative of the uplink band of the Band 13, and the third frequency range 120 may be representative of the downlink bands of both the Bands 12 and 13.

By way of another example, the 700 MHz band plan and an 800 MHz band plan for the United States may include a 700 MHz public safety band and an 800 MHz public safety band, respectively. The 700 MHz public safety band may include a downlink band that may include frequencies in the 758-775 MHz range and may also include an uplink band that may include frequencies in the 793-805 MHz range. Further, an uplink band associated with the 800 MHz public safety band may include frequencies in the 805-815 MHz range, and a downlink band associated with the 800 MHz public safety band may include frequencies in the 851-868 MHz range. Therefore the downlink bands associated with the 700 MHz and 800 MHz public safety bands may be separated by a guard band that includes the uplink bands associated with the 700 MHz and 800 MHz public safety bands. Additionally, the uplink bands associated with the 700 MHz and 800 MHz public safety bands may be spectrally adjacent to each other.

Therefore, in another example, the frequency ranges 116, 118, and 120 illustrated in FIG. 1A, may be representative of the different uplink and downlink bands in the 700 MHz and 800 MHz public safety bands. For example, in some embodiments, the first frequency range 116 may be representative of the downlink band of the 700 MHz public safety band, the second frequency range 118 may be representative of the downlink band of the 800 MHz public safety band, and the third frequency range 120 may be representative of the uplink bands of both the 700 MHz and 800 MHz public safety bands.

In the illustrated embodiment of FIG. 1A, the common port 104 may be configured to communicate the input signal 114 to the first filter 106 and the second filter 108. The first filter 106 may be configured to filter signals based on the first frequency range 116 (e.g., the uplink band of the Band 12 or the downlink band of the 700 MHz public safety band) such that, upon receiving the input signal 114, the first filter 106 may allow the first frequency range 116 to pass through the first filter 106 while filtering out frequencies outside of the first frequency range 116 (e.g., the second frequency range 118 and the third frequency range 120).

Therefore, in the illustrated embodiment of FIG. 1A, the first filter 106 may be configured to output a first-frequency-range signal 122 based on the first frequency range 116 where the first-frequency-range signal 122 may be transmitted in the first frequency range 116 and where frequencies outside of the first frequency range 116 (e.g., frequencies within the second frequency range 118 and the third frequency range 120) may be significantly attenuated (e.g., attenuated by a factor between 6 decibels (dB) and 60 dB). The first filter 106 may be configured to communicate the first-frequency-range signal 122 to the first-band port 110, which may emit the first-frequency-range signal 122.

The second filter 108 may be configured to filter signals based on the second frequency range 118 (e.g., the uplink band of the Band 13 or the downlink band of the 800 MHz public safety band) such that, upon receiving the input signal 114, the second filter 108 may allow the second frequency range 118 to pass through the second filter 108 while filtering out frequencies outside of the second frequency range 118 (e.g., the first frequency range 116 and the third frequency range 120).

Therefore, in the illustrated embodiment of FIG. 1A, the second filter 108 may be configured to output a second-frequency-range signal 124 based on the second frequency range 118 where the second-frequency-range signal 124 may be transmitted in the second frequency range 118 and where frequencies outside of the second frequency range 118 (e.g., frequencies within the first frequency range 116 and the third frequency range 120) may be significantly attenuated. The second filter 108 may be configured to communicate the second-frequency-range signal 124 to the second-band port 112, which may emit the second-frequency-range signal 124.

Therefore, the common-direction duplexer 102 may output the first-frequency range-signal 122 communicated in the first frequency range 116 and the second-frequency-range signal 124 communicated in the second frequency range 118 in response to receiving the input signal 114. Modifications may be made to the input signal 114 without departing from the scope of the present disclosure. For example, in some embodiments, the first frequency range 116 and the second frequency range 118 may be associated with different uplink bands and the third frequency range 120 may be associated with one or more downlink bands, such as described above with respect to Bands 12 and 13. In some of these embodiments, the input signal 114 may be an uplink signal communicated in the first frequency range 116 and/or the second frequency range 118. But, in these and other embodiments, the input signal 114 may not be communicated in the third frequency range 120 because the third frequency range 120 may be associated with downlink signals and communications and not uplink signals and communications.

In other embodiments, the first frequency range 116 and the second frequency range 118 may be associated with different downlink bands and the third frequency range 120 may be associated with one or more uplink frequency ranges, such as described above with respect to the 700 MHz and 800 MHz public safety bands. In these and other embodiments, the input signal 114 may be a downlink signal communicated in the first frequency range 116 and/or the second frequency range 118. But, in these and other embodiments, the input signal 114 may not be communicated in the third frequency range 120 because the third frequency range 120 may be associated with uplink signals and communications and not downlink signals and communications.

FIG. 1B illustrates operation of the common-direction duplexer 102 with respect to a first input signal 126 that may be received at the first-band port 110 and a second input signal 128 that may be received at the second-band port 112, according to some embodiments of the present disclosure. The first input signal 126 and the second input signal 128 are depicted in the frequency domain and, in the illustrated embodiment, may be transmitted in the first frequency range 116, the second frequency range 118 and the third frequency range 120. Accordingly, the first input signal 126 and the second input signal 128 of FIG. 1B may be substantially similar to the input signal 114 of FIG. 1A. However, the first input signal 126 may be received at the first-band port 110 and the second input signal 128 may be received at the second-band port 112 instead of being received at the common port 104, like the input signal 114. The first-band port 110 may be configured to communicate the first input signal 126 toward the first filter 106 and the second-band port 112 may be configured to communicate the second input signal 128 toward the second filter 108. As mentioned above, the first filter 106 may be configured to allow the first frequency range 116 to pass through the first filter 106 such that the first filter 106 may allow the first frequency range 116 of the first input signal 126 to pass through the first filter 106 while attenuating the second frequency range 118 and the third frequency range 120. Similarly, as mentioned above, the second filter 108 may be configured to allow the second frequency range 118 of the second input signal 128 to pass through the second filter 108 while attenuating the first frequency range 116 and the third frequency range 120.

The first filter 106 may be configured to communicate the filtered first signal 126 toward the common port 104 and the second filter 108 may be configured to communicate the filtered second signal 128 toward the common port 104. In instances when the filtered first signal 126 and the filtered second signal 128 are communicated to the common port 104 at substantially the same time, the common port 104 (or another element of the common-direction duplexer 102 before the common port 104) may be configured to combine the filtered first signal 126 and the filtered second signal 128 into an output signal 130. Accordingly, the output signal 130 may be communicated in the first frequency range 116 and the second frequency range 118 in response to the first-band port 110 and the second-band port 112 receiving the first signal 126 and the second signal 128, respectively. Additionally, the third frequency range 120 within the output signal 130 may be significantly attenuated due to the first filter 106 and the second filter 108.

In instances when the filtered first signal 126 and the filtered second signal 128 are not communicated to the common port 104 at substantially the same time, the common port 104 may output the filtered first signal 126 or the filtered second signal 128 without outputting the other filtered signal. For example, upon receiving only the filtered first signal 126 from the first filter 106, the common port 104 may output the filtered first signal 126, which may be communicated in the first frequency range 116 and in which the second frequency range 118 and the third frequency range 120 may be significantly attenuated. As another example, upon receiving only the filtered second signal 128 from the second filter 108, the common port 104 may output the filtered second signal 128, which may be communicated in the second frequency range 118 and in which the first frequency range 116 and the third frequency range 120 may be significantly attenuated.

As mentioned above, the first frequency range 116 and the second frequency range 118 may both be associated with uplink bands or may both be associated with downlink bands. Therefore, the first filter 106 and the second filter 108 of the common-direction duplexer 102 may both be associated with uplink bands or may both be associated with downlink bands such that the common-direction duplexer 102 may be configured to receive and output signals at the common port 104, the first-band port 110, and the second-band port 112 that typically propagate in the same direction. In contrast, a conventional duplexer typically includes a filter configured based on uplink bands and another filter configured based on downlink bands such that the conventional duplexer may be configured to receive and output signals at common, uplink, and downlink ports of the conventional duplexer that typically propagate in different directions. Additionally, as mentioned above, in some embodiments, the common-direction duplexer 102 may be included in a signal booster configured to apply a gain to wireless signals communicated in the first frequency range 116, the second frequency range 118, and/or the third frequency range 120. In some of these embodiments, the first frequency range 116 may be associated with a first uplink band included in a first communication band, the second frequency range 118 may be associated with a second uplink band included in a second communication band, and the third frequency range 120 may be associated with spectrally adjacent first and second downlink bands included in the first communication band and the second communication band, respectively. In other embodiments, the first frequency range 116 may be associated with a first downlink band included in a different first communication band, the second frequency range 118 may be associated with a second downlink band included in a different second communication band, and the third frequency range 120 may be associated with spectrally adjacent first and second uplink bands included in the different first communication band and the different second communication band, respectively.

Figure 2:
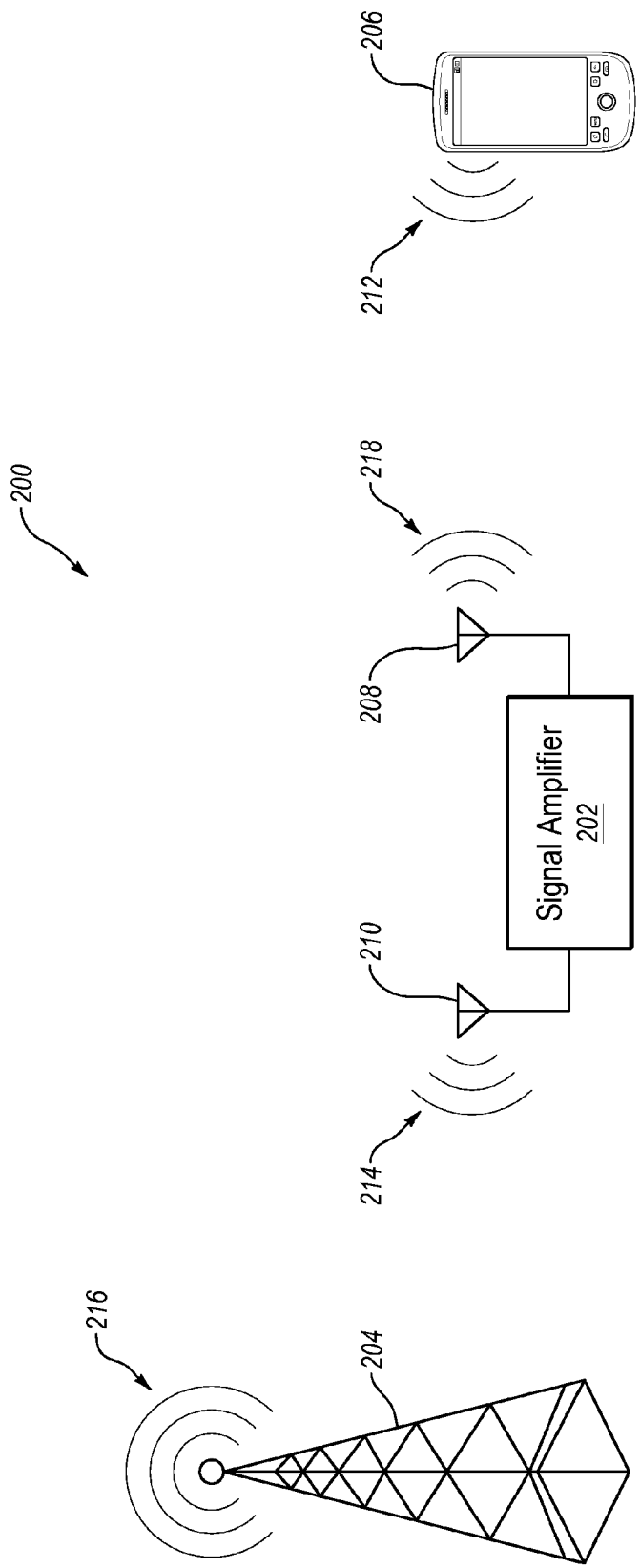
FIG. 2 illustrates an example wireless communication system.

FIG. 2 illustrates an example wireless communication system 200 (referred to hereinafter as "system 200"), arranged in accordance with at least some embodiments described herein. The system 200 may be configured to provide wireless communication services to a wireless device 206 via an access point 204. The system 200 may further include a signal booster 202. The signal booster 202 may be any suitable system, device, or apparatus configured to receive the wireless signals communicated between the access point 204 and the wireless device 206 and to amplify, repeat, filter, or otherwise process the received wireless signals, and to re-transmit the processed wireless signals. Although not expressly illustrated in FIG. 2, the system 200 may include any number of access points 204 providing wireless communication services to any number of wireless devices 206. Therefore, the system 200 may include any number of signals 212 and 216.

The wireless communication services provided by the system 200 may include voice services, data services, messaging services, and/or any suitable combination thereof. The system 200 may include a Frequency Division Duplexing network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 200 may be configured to operate as a second generation (2G) wireless communication network, a third generation (3G) wireless communication network, a fourth generation (4G) wireless communication network, and/or a Wi Fi network. In these or other embodiments, the system 200 may be configured to operate as a long term evolution (LTE) wireless communication network.

The access point 204 may be any suitable wireless network communication point and may include, by way of example but not limitation, a base station, a remote radio head (RRH), a satellite, a wireless router, or any other suitable communication point. The wireless device 206 may be any device that may use the system 200 for obtaining wireless communications services and may include, by way of example and not limitation, a cellular phone, a smartphone, a personal data assistant (PDA), a laptop computer, a personal computer, a tablet computer, a wireless communication card, or any other similar device configured to communicate within the system 200.

As signals propagate between the access point 204 and the wireless device 206, the signals may be affected during the propagation such that, in some instances, the wireless signals communicated between the access point 204 and the wireless device 206 may be substantially degraded. The signal degradation may result in the access point 204 or the wireless device 206 not receiving, detecting, or extracting information from the wireless signals. Therefore, the signal booster 202 may be configured to increase the power of and/or improve the signal quality of the wireless signals such that the communication of the wireless signals between the access point 204 and the wireless device 206 may be improved.

In some embodiments, the signal booster 202 may receive a wireless signal communicated between the access point 204 and the wireless device 206 that may be converted into an electrical signal (e.g., via an antenna). The signal booster may be configured to amplify the electrical signal and the amplified electrical signal may be converted into an amplified wireless signal that is transmitted. The signal booster 202 may amplify the electrical signal by applying a gain to the electrical signal. The gain may be a set gain or a variable gain, and may be less than, equal to, or greater than one. Therefore, in the present disclosure, the term "amplify" may refer to applying any gain to a wireless signal even if the gain is less than one.

In some embodiments, the signal booster 202 may adjust the gain based on conditions associated with communicating the wireless signals (e.g., providing noise floor, oscillation, and/or overload protection). In these and other embodiments, the signal booster 202 may adjust the gain in real time. In these or other embodiments, the signal booster 202 may also filter out noise associated with the received wireless signal such that the retransmitted wireless signal may be a cleaner signal than the received wireless signal. Therefore, the signal booster 202 may improve the communication of wireless signals between the access point 204 and the wireless device 206.

For example, the wireless device 206 may communicate a wireless uplink signal 212 intended for reception by the access point 204 and a first antenna 208 may be configured to receive the wireless uplink signal. The first antenna 208 may be configured to convert the received wireless uplink signal 212 into an electrical uplink signal. Additionally, the first antenna 208 may be communicatively coupled to a first interface port (not expressly depicted in FIG. 2) of the signal booster 202 such that the signal booster 202 may receive the electrical uplink signal 212 at the first interface port. An interface port may be any suitable port configured to interface the signal booster 202 with another device (e.g., an antenna or a modem) from which the signal booster 202 may receive a signal and/or to which the signal booster 202 may communicate a signal.

In some embodiments, the signal booster 202 may be configured to apply a gain to the electrical uplink signal to amplify the electrical uplink signal. In the illustrated embodiment, the signal booster 202 may direct the amplified electrical uplink signal toward a second interface port (not expressly depicted in FIG. 2) of the signal booster 202 that may be communicatively coupled to a second antenna 210. The second antenna 210 may be configured to receive the amplified electrical uplink signal from the second interface port and may convert the amplified electrical uplink signal into an amplified wireless uplink signal 214 that may also be transmitted by the second antenna 210. The amplified wireless uplink signal 214 may be received by the access point 204.

In some embodiments, the signal booster 202 may also be configured to filter the electrical uplink signal to remove at least some noise associated with the received wireless uplink signal 212. Consequently, the amplified wireless uplink signal 214 may have a better signal to noise ratio (SNR) than the wireless uplink signal 212 that may be received by the first antenna 208. Accordingly, the signal booster 202 may be configured to improve the communication of uplink signals between the access point 204 and the wireless device 206. The use of the term "uplink signal" without specifying wireless or electrical uplink signals may refer to wireless uplink signals or electrical uplink signals.

As another example, the access point 204 may communicate a wireless downlink signal 216 intended for the wireless device 206 and the second antenna 210 may be configured to receive the wireless downlink signal 216. The second antenna 210 may convert the received wireless downlink signal 216 into an electrical downlink signal such that the electrical downlink signal may be received at the second interface port of the signal booster 202. In some embodiments, the signal booster 202 may be configured to apply a gain to the electrical downlink signal to amplify the electrical downlink signal. The signal booster 202 may also be configured to direct the amplified electrical downlink signal toward the first interface port of the signal booster 202 such that the first antenna 208 may receive the amplified electrical downlink signal. The first antenna 208 may be configured to convert the amplified electrical downlink signal into an amplified wireless downlink signal that may also be transmitted by the first antenna 208. Accordingly, the amplified downlink signal 218 may be received by the wireless device 206.

In some embodiments, the signal booster 202 may also be configured to filter the electrical downlink signal to remove at least some noise associated with the received wireless downlink signal 216. Therefore, the amplified wireless downlink signal 218 may have a better SNR than the wireless downlink signal 216 received by the second antenna 210. Accordingly, the signal booster 202 may also be configured to improve the communication of downlink signals between the access point 204 and the wireless device 206. The use of the term "downlink signal" without specifying wireless or electrical downlink signals may refer to wireless downlink signals or electrical downlink signals.

Modifications may be made to the system 200 without departing from the scope of the present disclosure. For example, in some embodiments, the distance between the signal booster 202 and the wireless device 206 may be relatively close as compared to the distance between the signal booster 202 and the access point 204. Further, the system 200 may include any number of signal boosters 202, access points 204, and/or wireless devices 206. Further, in some embodiments the signal booster 202 may be integrated with the wireless device 206, and in other embodiments, the signal booster 202 may be separate from the wireless device 206. Also, in some embodiments, the signal booster 202 may be included in a cradle configured to hold the wireless device 206. Additionally, in some embodiments, the signal booster 202 may be configured to communicate with the wireless device 206 via wired communications (e.g., using electrical signals communicated over a wire) instead of wireless communications (e.g., via wireless signals).

Additionally, although the signal booster 202 is illustrated and described with respect to receiving and transmitting signals via the first antenna 208 and the second antenna 210, the scope of the present disclosure is not limited to such applications. For example, in some embodiments, the signal booster 202 (or other signal boosters described herein) may receive and/or transmit signals via one or more modems Further, as mentioned above, in some embodiments the signal booster 202 may be configured to amplify signals communicated in a first uplink band included in a first communication band (e.g., the uplink band of the Band 12), a second uplink band included in a second communication band (e.g., the uplink band of the Band 13), and also signals communicated in spectrally adjacent first and second downlink bands included in the first communication band and the second communication band, respectively (e.g., the downlink bands of the Band 12 and the Band 13). In these and other embodiments, the first and second downlink bands may be spectrally between the first and second uplink bands.

In some embodiments, the signal booster 202 may be configured to amplify signals communicated in a different first downlink band included in a different first communication band (e.g., the downlink band of the 700 MHz public safety band) and a different second downlink band included in a different second communication band (the downlink band of the 800 MHz public safety band). In these embodiments, the signal booster 202 may also be configured to amplify signals communicated in spectrally adjacent different first and second uplink bands included in the different first communication band and the different second communication band, respectively (the uplink bands of the 700 MHz and 800 MHz public safety bands). In these and other embodiments, the different first and second uplink bands may be spectrally between the different first and second downlink bands.

Figure 3:
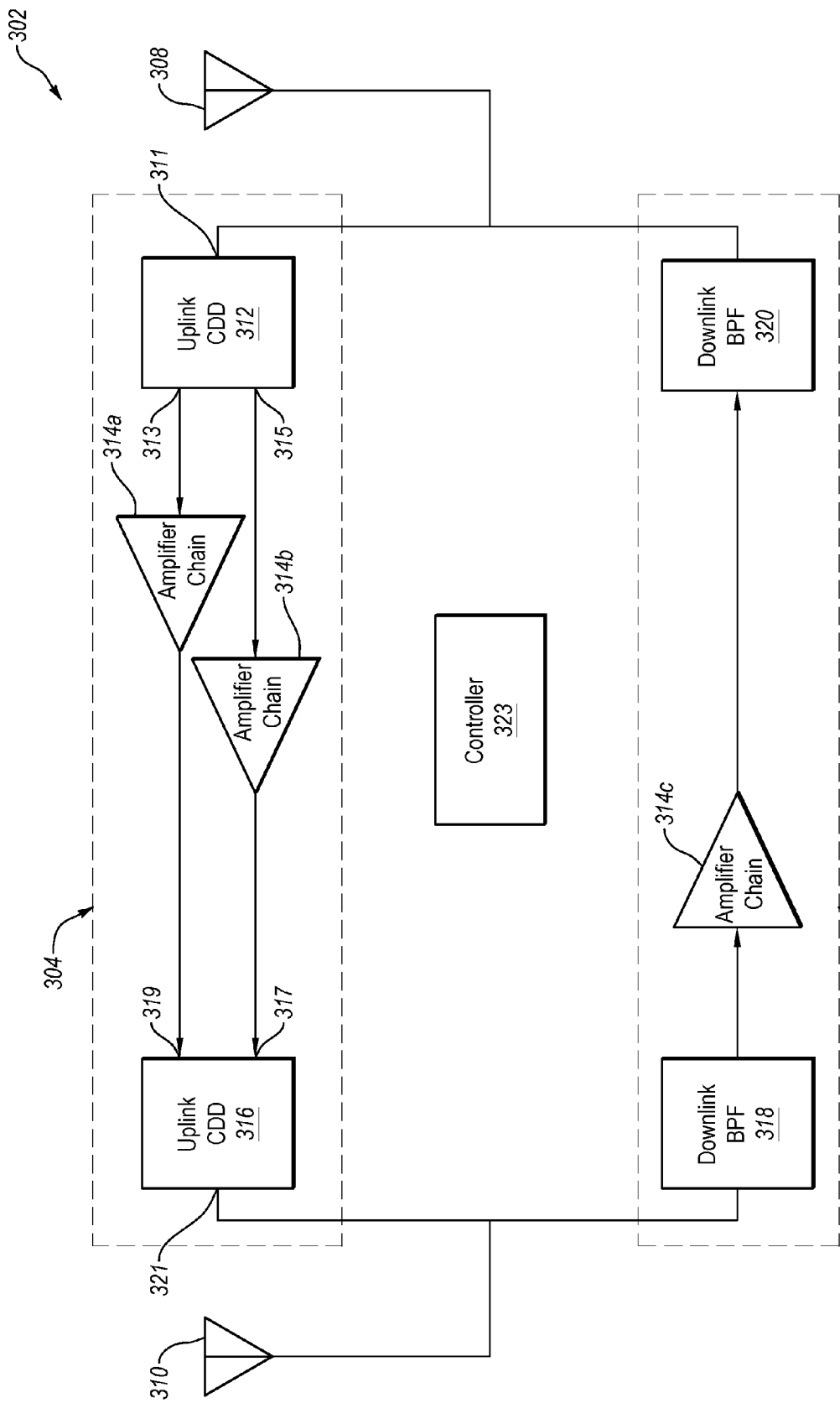
FIGS. 3-6 illustrates example embodiments of a signal amplifier.

FIG. 3 illustrates an example embodiment of a signal booster 302, in accordance with some embodiments described herein. In some embodiments, the signal booster 302 may be configured to operate in a manner analogous to the operation of the signal booster 202 of FIG. 2. In the illustrated embodiment, the signal booster 302 is configured to amplify signals communicated in a first uplink band included in a first communication band (e.g., the uplink band of the Band 12), a second uplink band included in a second communication band (e.g., the uplink band of the Band 13). Additionally, the signal booster 302 may be configured to process signals communicated in spectrally adjacent first and second downlink bands included in the first communication band and the second communication band, respectively (e.g., the downlink bands of the Band 12 and the Band 13). Additionally, the first and second downlink bands may be spectrally between the first and second uplink bands.

The signal booster 302 may include an uplink path 304, a downlink path 306, a first interface port (not expressly depicted in FIG. 3) communicatively coupled to a first antenna 308, and a second interface port (not expressly depicted in FIG. 3) communicatively coupled to a second antenna 310. The uplink path 304 may be configured to amplify uplink signals received at the first antenna 308 from a wireless device (e.g., the wireless device 206 of FIG. 2), and communicate the amplified uplink signals to the second antenna 310 for transmission by the second antenna 310 such that an access point of a wireless communication system (e.g., the access point 204 of FIG. 2) may receive the amplified uplink signals. The downlink path 306 may be similarly configured to amplify downlink signals received at the second antenna 310 from the access point, and communicate the amplified downlink signals to the first antenna 308 for transmission by the first antenna 308 such that the wireless device may receive the amplified uplink signals.

The uplink path 304 may include an uplink common-direction duplexer 312 (referred to hereinafter as "the uplink CDD 312") substantially similar to the common-direction duplexer 102 described above in FIGS. 1A and 1B. The uplink CDD 312 may be configured to receive an uplink signal from the first antenna 308 at a common port 311 of the uplink CDD 312. As mentioned above, the uplink signal may be transmitted in a first uplink band associated with a first communication band and/or a second uplink band associated with a second communication band. As such, the uplink CDD 312 may include a first filter communicatively coupled between the common port 311 and a first-band port 313 of the uplink CDD 312. The uplink CDD 312 may also include a second filter communicatively coupled between the common port 311 and a second-band port 315 of the uplink CDD 312.

The first filter of the uplink CDD 312 may be configured to filter the received uplink signal based on the frequency range of the first uplink band. The first uplink band may accordingly pass through the first filter and frequencies outside of the first uplink band, including the second uplink band, may be filtered out such that the uplink CDD 312 may output a first-frequency-range uplink signal at the first-band port 313. Therefore, the first-frequency-range uplink signal may include the portion of the received uplink signal transmitted in the first uplink band, while other portions of the received uplink signal not transmitted in the first uplink band (e.g., portions transmitted in the second uplink band, noise, etc.), if they are present, may be substantially attenuated. As described in further detail below, the first filter of the uplink CDD 312 may also be thus configured to filter out any downlink signals that may be received at the common port 311.

The second filter of the uplink CDD 312 may be configured to filter the received uplink signal based on the frequency range of the second uplink band. The second uplink band may accordingly pass through the second filter and frequencies outside of the second uplink band, including the first uplink band, may be filtered out such that the uplink CDD 312 may output a second-frequency-range uplink signal at the second-band port 315. Therefore, the second-frequency-range uplink signal may include the portion of the received uplink signal transmitted in the second uplink band, while other portions of the received uplink signal not transmitted in the second uplink band (e.g., portions transmitted in the first uplink band, noise, etc.), if they are present, may be substantially attenuated. As described in further detail below, the second filter of the uplink CDD 312 may also be thus configured to filter out any downlink signals that may be received at the common port 311.

The first-band port 313 of the uplink CDD 312 may be configured to communicate the first-frequency-range uplink signal to an uplink amplifier chain 314a and the second-band port 315 of the uplink CDD 312 may be configured to communicate the second-frequency-range uplink signal to an uplink amplifier chain 314b. The uplink amplifier chains 314a and 314b may each include one or more amplifiers configured to apply a gain to signals received at the uplink amplifier chains 314a and 314b. In the illustrated embodiment, the amplifier chain 314a may be configured to apply a gain to the first-frequency-range uplink signal communicated from the first-band port 313 and the amplifier chain 314b may be configured to apply a gain to the second-frequency-range uplink signal communicated from the second-band port 315.

As mentioned above, the gain may be a set gain, or a variable gain and may be less than, equal to, or greater than one. In some embodiments, the gains of the uplink amplifier chains 314a and 314b may be adjusted by a controller 323 communicatively coupled to the amplifier chains 314a and 314b based on wireless communication conditions. Additionally, in some embodiments, the controller 323 may adjust the gain of the amplifier chain 314a differently than that of the amplifier chain 314b depending on conditions associated with the first uplink band and the second uplink band.

If included, the controller 323 may be implemented by any suitable mechanism, such as a program, software, function, library, software as a service, analog or digital circuitry, or any combination thereof. The controller 323 may also include a processor coupled to memory. The processor may include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor may interpret and/or execute program instructions and/or process data stored in the memory. The instructions may include instructions for adjusting the gains of the amplifier chains 314a and 314b. For example, the adjustments may be based on wireless signal inputs.

The memory may include any suitable computer readable media configured to retain program instructions and/or data for a period of time. By way of example, and not limitation, such computer readable media may include tangible computer readable storage media including RAM, ROM, EEPROM, CD ROM or other optical disk storage, magnetic disk storage or other magnetic storage devices, flash memory devices (e.g., solid state memory devices) or any other storage medium which may be used to carry or store desired program code in the form of computer executable instructions or data structures and which may be accessed by a general purpose or special purpose computer. Combinations of the above may also be included within the scope of computer readable media. Computer executable instructions may include, for example, instructions and data that cause a general purpose computer, special purpose computer, or special purpose processing device to perform a certain function or group of functions.

The amplifier chain 314a may be configured to communicate the amplified first-frequency-range uplink signal toward a first-band port 319 of an uplink common-direction duplexer 316 (referred to hereinafter as "the uplink CDD 316"). The amplifier chain 314b may be configured to communicate the amplified second-frequency-range uplink signal toward a second-band port 317 of the uplink CDD 316. The uplink CDD 316 may be substantially similar to the uplink CDD 312 and the common-direction duplexer 102 described above in FIGS. 1A and 1B.

The uplink CDD 316 may include a first filter communicatively coupled between the first-band port 319 and a common port 321 of the uplink CDD 312. The uplink CDD 316 may also include a second filter communicatively coupled between the second-band port 317 and the common port 321 of the uplink CDD 316.

The first filter of the uplink CDD 316 may be configured similarly to the first filter of the uplink CDD 312 such that the first filter of the uplink CDD 316 may filter the received first-frequency-range uplink signal based on the frequency range associated with the first uplink band. Therefore, the first-frequency-range uplink signal may pass through the first filter of the uplink CDD 316 toward the common port 321 of the uplink CDD 316. The second filter of the uplink CDD 316 may be configured similarly to the second filter of the uplink CDD 312 such that the second filter of the uplink CDD 316 may filter the received second-frequency-range uplink signal based on the frequency range of the second uplink band. Therefore, the second-frequency-range uplink signal may pass through the second filter of the uplink CDD 316 toward the common port 321 of the uplink CDD 316.

The uplink CDD 316 may be configured to output the first-frequency-range uplink signal and the second-frequency-range uplink signal via the common port 321 after they have respectively passed through the first and second filters of the uplink CDD 316. As described above, in some instances, the uplink CDD 316 may output a combined uplink signal at the common port 321 that may be communicated in the first and second uplink bands. In other instances, the uplink CDD 316 may output only the first-frequency-range uplink signal or the second-frequency-range uplink signal, depending on the timing of receiving the first-frequency-range uplink signal and the second-frequency-range uplink signal. The uplink signals (combined or otherwise) may then be communicated to the second antenna 310 from the common port 321 for transmission by the second antenna 310.

Accordingly, the uplink path 304 may be configured to process and amplify an uplink signal that may be communicated in different uplink bands associated with different bands by using common-direction duplexers. The uplink path 304 configured in the manner as described may allow for individual gain adjustments for the first and second uplink bands and may reduce interference that may occur between the first and second uplink bands.

Additionally, in some embodiments, the common port 311 of the uplink CDD 312 may also receive a downlink signal from the downlink path 306. The downlink signal may be communicated in a first downlink band and/or a second downlink band. In the illustrated embodiment, the first downlink band and the second downlink band may be spectrally adjacent to each other and may be spectrally between the first uplink band and the second uplink band. For example, the first downlink band may be the downlink band of the Band 12 and the second downlink band may be the downlink band of the Band 13, which may be spectrally adjacent to each other. However, the first downlink band and the second downlink band may each be outside of the first uplink band and the second uplink band such that the first and second filters of the uplink CDD 312 may filter out the first downlink band and the second downlink band. Therefore, the downlink signal received at the common port 311 may be substantially attenuated and filtered out by the uplink CDD 312 such that the uplink path 304 may be isolated from the downlink path 306 by the uplink CDD 312.

In the present disclosure, the terms "isolation" or "isolated" with respect to circuits or paths may refer to reducing the presence of unwanted signals within one path or circuit. For example, reducing the presence of uplink signals in the downlink path 306 or reducing the presence of downlink signals in the uplink path 304 may improve isolation between the uplink path 304 and the downlink path 306. The isolation may be accomplished by directing unwanted signals away from particular paths or circuits, attenuating the unwanted signals within the particular paths or circuits, or any other suitable method or mechanism. In some embodiments, isolation may be referred to in dB indicating a degree of attenuation of an unwanted signal in a particular circuit or path. For example, an isolation of 30 dB between the uplink path 304 and the downlink path 306 may indicate that a downlink signal may be attenuated by 30 dB in the uplink path 304 and that an uplink signal may be attenuated by 30 dB in the downlink path 306.

Further, in some embodiments, the common port 321 of the uplink CDD 316 may receive the downlink signal from the second antenna 310. However, as described above, the first downlink band and the second downlink band may each be outside of the first uplink band and the second uplink band such that the first and second filters of the uplink CDD 316 may filter out the first downlink band and the second downlink band similar to the filtering performed by the first and second filters of the uplink CDD 312. Therefore, the downlink signal received at the common port 321 may be substantially attenuated and filtered out by the uplink CDD 316 such that the uplink path 304 may also be isolated from the downlink path 306 by the uplink CDD 316.

The downlink path 306 may be configured to receive the downlink signal from the second antenna 310 at a downlink band pass filter (BPF) 318. As mentioned above, the downlink signal may be communicated in the first downlink band and/or the second downlink band. Additionally, as described above, in the illustrated embodiment, the first downlink band and the second downlink band may be spectrally adjacent to each other and may be spectrally between the first uplink band and the second uplink band. For example, the first downlink band may be associated with the downlink band of Band 12 and the second downlink band may be associated with the downlink band of Band 13. Therefore, the downlink BPF 318 may be configured to filter the downlink signal based on a frequency range that includes the first downlink band and the second downlink band such that the downlink signal may pass through the downlink BPF 318 if the downlink signal is transmitted in the first downlink band and/or the second downlink band. The downlink BPF 318 may be any suitable filter including, but not limited to, a SAW filter, a BAW filter, or a ceramic filter.

Additionally, the downlink BPF 318 may be configured to filter out frequencies outside of the first and second downlink bands, such as the first and second uplink bands of which the uplink path 304 may be associated. Therefore, any portion of the combined uplink signal output by the uplink CDD 316 at the common port 321 that may be received by the downlink BPF 318 may be filtered out (e.g., substantially attenuated) by the downlink BPF 318. As such, the downlink BPF 318 may also provide isolation between the downlink path 306 and the uplink path 304.

The downlink BPF 318 may be configured to communicate the filtered downlink signal toward an amplifier chain 314c of the downlink path 306. The amplifier chain 314c may be substantially similar to the amplifier chains 314a and 314b and may include one or more amplifiers configured to apply a gain to the downlink signal communicated by the BPF 318. The gain may be a set gain, or a variable gain and may be less than, equal to, or greater than one. In some embodiments, the gain of the uplink amplifier chain 314c may be adjusted by the controller 323.

The amplifier chain 314c may be configured to communicate the amplified downlink signal toward a downlink BPF 320 of the downlink path 306. The downlink BPF 320 may be substantially similar to the downlink BPF 318. Therefore, the downlink BPF 320 may be configured to filter the downlink signal based on the frequency range that includes the first downlink band and the second downlink band such that the amplified downlink signal may pass through the downlink BPF 320 if the downlink signal is transmitted in the first downlink band and/or the second downlink band. Like the downlink BPF 318, the downlink BPF 320 may be any suitable filter including, but not limited to, a SAW filter, a BAW filter, or a ceramic filter.

Additionally, similarly to the downlink BPF 318, the downlink BPF 320 may be configured to filter out frequencies outside of the first and second downlink bands, such as the first and second uplink bands of which the uplink path 304 may be associated. Therefore, any portion of the uplink signal received by the first antenna 308 that may be received by the downlink BPF 320 from the first antenna 308 may be filtered out (e.g., substantially attenuated) by the downlink BPF 320. As such, the downlink BPF 320 may also provide isolation between the downlink path 306 and the uplink path 304.

Therefore, the uplink path 304 of the signal booster 302 may be configured to amplify signals communicated in a first uplink band included in a first communication band (e.g., the uplink band of the Band 12) and a second uplink band included in a second communication band (e.g., the uplink band of the Band 13). Additionally, the downlink path 306 of the signal booster 302 may be configured to process signals communicated in spectrally adjacent first and second downlink bands included in the first communication band and the second communication band, respectively (e.g., the downlink bands of the Band 12 and the Band 13).

Modifications, additions, or omissions may be made to the signal booster 302 without departing from the scope of the present disclosure. For example, as mentioned above, in some embodiments, the signal booster 302 may be configured to amplify signals communicated in a different first downlink band included in a different first communication band, a different second downlink band included in a different second communication band, and also signals communicated in spectrally adjacent different first and second uplink bands included in the different first communication band and the different second communication band, respectively. In these embodiments, the downlink path of the signal booster 302 may accordingly be configured with common-direction duplexers and different amplifier chains for the different downlink bands similarly to the uplink path 304 of FIG. 3. Further, in some of these embodiments, the uplink path may accordingly be configured with BPF's similarly to the downlink path 306 of FIG. 3.

Further, in some embodiments, the downlink BPF 320 may be included with the uplink CDD 312 such that the uplink CDD 312 may include the BPF 320 as a third filter communicatively coupled between the common port 311 and a third-band port of the uplink CDD 312. Similarly, in some of these or other embodiments, the downlink BPF 318 may be included with the uplink CDD 316 such that the uplink CDD 316 may include the BPF 318 as a third filter communicatively coupled between the common port 321 and a third port of the uplink CDD 316.

Additionally, in some embodiments, more isolation (e.g., through attenuation, impedance matching, and/or signal directing) between the uplink path 304 and the downlink path 306 may be desired than that provided by the uplink CDDs 312 and 316 and the downlink BPFs 318 and 320. In some embodiments, the greater isolation may be desired in instances where the guard bands between the uplink and downlink bands may be substantially narrow (e.g., less than 30 megahertz (MHz)) such that unwanted signals (e.g., downlink signals in the uplink path 304 or uplink signals in the downlink path 306) may not be sufficiently filtered by the uplink CDDs 312 and 316 and the downlink BPFs 318 and 320. Additionally, inadequate isolation between filters may result in the filters unintentionally interacting with and degrading each other's performance. FIGS. 4-7 illustrate example embodiments of signal boosters that may provide increased isolation between uplink and downlink paths.

Figure 4:
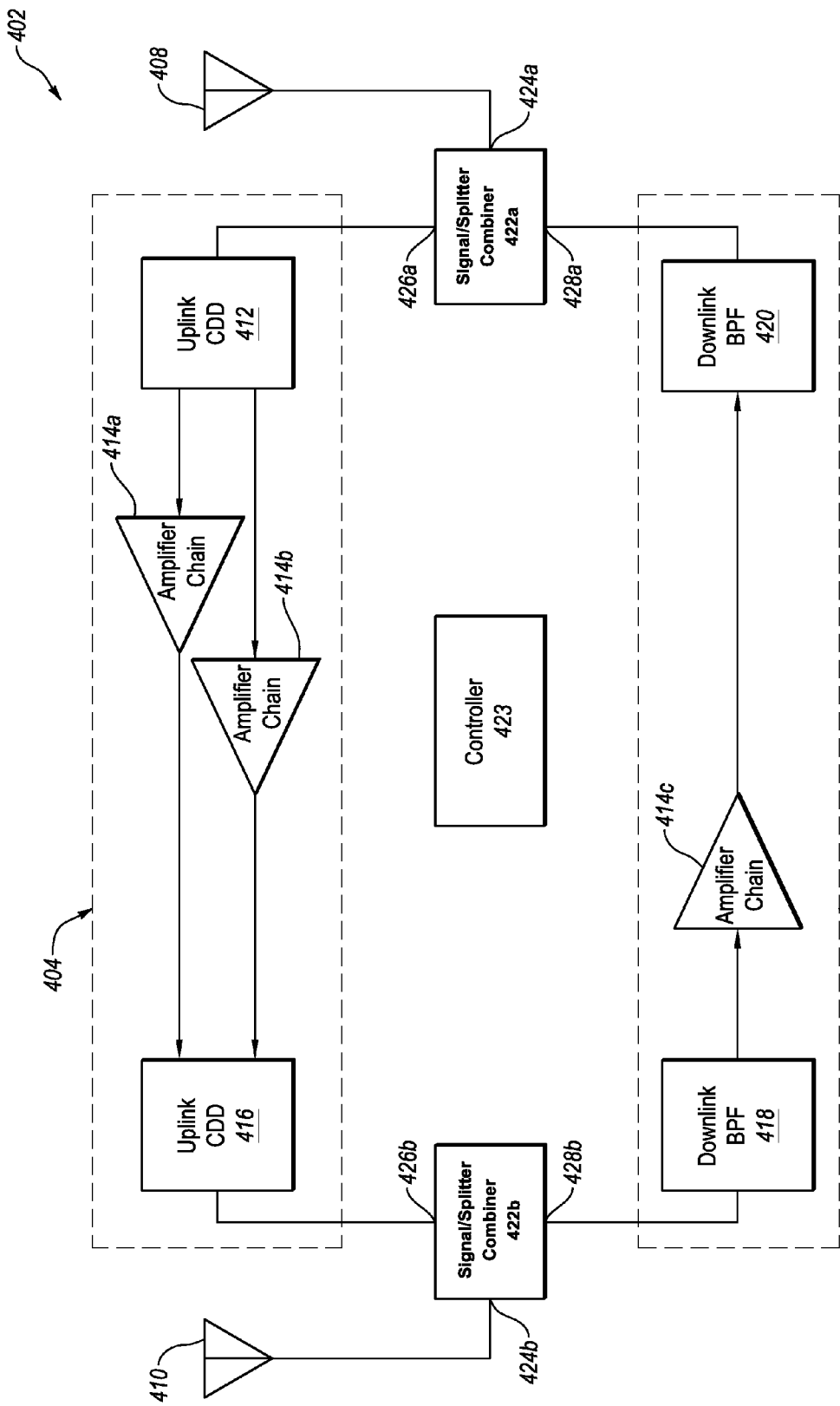

FIG. 4 illustrates an example embodiment of a signal booster 402, in accordance with some embodiments described herein. In some embodiments, the signal booster 402 may be configured to operate in a manner analogous to the operation of the signal booster 202 of FIG. 2. Additionally, in the illustrated embodiment, the signal booster 402 may include a controller 423, a first antenna 408, a second antenna 410, an uplink path 404, and a downlink path 406 substantially similar to the controller 323, the first antenna 308, the second antenna 310, the uplink path 304, and the downlink path 306, respectively, of the signal booster 302 of FIG. 3.

Therefore, the uplink path 404 may include an uplink CDD 412, amplifier chains 414a and 414b, and an uplink CDD 416 substantially similar to the uplink CDD 312, amplifier chains 314a and 314b, and the uplink CDD 316 of FIG. 3. Further, the downlink path 406 may include a downlink BPF 418, an amplifier chain 414c, and a downlink BPF 420 substantially similar to the downlink BPF 318, the amplifier chain 314c, and the downlink BPF 320 of FIG. 3. However, unlike the signal booster 302 of FIG. 3, the signal booster 402 may also include signal splitters/combiners 422a and 422b.

The signal splitters/combiners 422a and 422b may provide additional signal isolation than that provided by the uplink CDDs 412 and 416 and the downlink BPFs 418 and 420. The signal splitters/combiners 422a and 422b may help reduce the occurrence of downlink signals being transmitted in or interfering with the uplink path 404 and may also help reduce the occurrence of uplink signals being transmitted in or interfering with the downlink path 406.

For example, the signal splitters/combiners 422a and 422b may include first ports 424a and 424b, respectively, second ports 426a and 426b, respectively, and third ports 428a and 428b, respectively. The first port 424a and first port 424b may be communicatively coupled to the first antenna 408 and the second antenna 410, respectively. The second ports 426a and 426b may be communicatively coupled to the uplink path 404 and the third ports 428a and 428b may be communicatively coupled to the downlink path 406.

The signal splitters/combiners 422a and 422b may be configured to split signals received at their respective first ports 424 into two signals, where a combined power level of the two signals may approximate a power level of the signal received at the respective first ports 424. The signal splitters/combiners 422a and 422b may be configured to output one of the signals through their respective second ports 426 and output the other signal through their respective third ports 428. Accordingly, the signal splitters/combiners may act as signal/power splitters with respect to signals received at their respective first ports 424.

Additionally, the signal splitters/combiners 422a and 422b may be configured to output signals received at their respective second ports 426 and/or third ports 428 at their respective first ports 424. When signals are received at the second port 426 and the third port 428 of a signal splitter/combiner 422 at substantially the same time, the signal splitter/combiner 422 may combine the two signals into one combined signal, where the power level of the combined signal may be approximately that of the sum of the power levels of the two signals. Accordingly, the signal splitters/combiners may act as signal/power combiners with respect to signals received at their respective second ports 426 and third ports 428 at approximately the same time.

In the illustrated embodiment, the signal splitter/combiner 422a may be configured to direct downlink signals received from the downlink path 406 at the third port 428a toward the first antenna 408 via the first port 424a. Similarly, the signal splitter/combiner 422b may be configured to direct uplink signals received from the uplink path 404 at the second port 426b toward the second antenna 410 via the first port 424b. Accordingly, the signal splitter/combiner 422a may direct downlink signals received from the downlink path 406 away from the uplink path 404 and the signal splitter/combiner 422b may direct uplink signals received from the uplink path 404 away from the downlink path 406 to provide isolation between the uplink path 404 and the downlink path 406.

Additionally, as mentioned above, upon receiving an uplink signal at the first port 424a from the first antenna 408, the signal splitter/combiner 422a may split the uplink signal into two signals where one of the signals may be communicated to the uplink CDD 412 via the second port 426a and the other signal may be communicated to the downlink BPF 420 via the third port 428a. The uplink signal received by the downlink BPF 420 from the third port 428a may have attenuated power as compared to the uplink signal received at the first port 424a due to the power splitting performed by the signal splitter/combiner 422a. Therefore, the uplink signal received by the BPF 420 may already be somewhat attenuated before being attenuated even more by the downlink BPF 420, which may help isolate the uplink path 404 from the downlink path 406.

Additionally, the amplifier chain 414c may be directional such that the amplifier chain 414c may be configured to amplify signals propagating through the downlink path 406 in a first direction that is from the signal splitter/combiner 422b to the signal splitter/combiner 422a (e.g., downlink signals received at the second antenna 410). The directionality of the amplifier chain 414c may also be such that the amplifier chain 414c may be configured to attenuate or stop signals propagating in a second direction that is from the signal splitter/combiner 422a to the signal splitter/combiner 422b (e.g., uplink signals received at the first antenna 408).

The ability of the amplifier chain 414c to stop and/or attenuate signals propagating in the second direction may depend on the signal power of the signal propagating in the second direction. The ability of the amplifier chain 414c to stop and/or attenuate signals propagating in the second direction may also depend on the gain of the amplifier chain 414c being higher than the power of the signal propagating in the second direction. As mentioned above, uplink signals that may be received by the downlink path 406 from the signal splitter/combiner 422a may be attenuated, such that the ability of the amplifier chain 414c to attenuate or stop the uplink signals may be increased by the signal splitter/combiner 422a and/or the downlink BPF 420. In some embodiments, the attenuation done by the signal splitter/combiner 422a and the gain of the amplifier chain 414c may be such that the downlink BPF 420 may be omitted from the downlink path 406 while also substantially negating uplink signals in the downlink path 406.

The signal splitter/combiner 422b, uplink CDD 416 and amplifier chains 414a and 414b may be similarly configured to attenuate and stop downlink signals received at the second antenna 410 and that may enter the uplink path 404.

In some embodiments, the signal splitter/combiner 422a may also be configured such that the first port 424a may be substantially impedance matched with the first antenna 408, the second port 426a may be substantially impedance matched with the uplink path 404 and the third port 428a may be substantially impedance matched with the downlink path 406. Additionally, the signal splitter/combiner 422b may be configured such that the first port 424b may be substantially impedance matched with the second antenna 410, the second port 426b may be substantially impedance matched with the uplink path 404 and the third port 428b may be substantially impedance matched with the downlink path 406. Therefore, the incidence of standing waves may be reduced by the impedance matching.

As indicated above, isolation between circuits or paths may relate to the amount of power of an unwanted signal that may leak into a circuit or path. Therefore, standing waves that increase signal power may result in diminished isolation because the greater signal power of a signal may result in higher power of that signal in a circuit or path where the signal may be unwanted. Accordingly, providing impedance matching by the signal splitters/combiners 422a and 422b may also improve isolation between the uplink path 404 and the downlink path 406.

In some embodiments, using the signal splitters/combiners 422a and 422b as isolators may reduce the roll off requirements of the filters associated with the uplink CDDs 412 and 416 and the downlink BPFs 418 and 420. For example, in some instances the guard bands between the uplink and downlink bands of the uplink and downlink signals amplified by the signal booster 402 may be relatively narrow. Therefore, without the signal splitters/combiners 422a and 422b, in order to adequately filter out the downlink signals, the filters of the uplink CDDs 412 and 416 may need to have a relatively steep roll off, which may add considerable cost. Similarly, without the signal splitters/combiners 422a and 422b, in order to adequately filter out the uplink signals, the filters of the downlink BPFs 418 and 420 may also need to have a relatively steep roll off, which may also add more cost.

However, by adding the signal splitters/combiners 422a and 422b as isolators, the roll off requirements of the filters associated with the uplink CDDs 412 and 416 and the downlink BPFs 418 and 420 may be reduced because the occurrence and/or power level of uplink signals received by the downlink BPFs 418 and 420 and the occurrence and/or power level of downlink signals received by the uplink CDDs 412 and 416 may be substantially reduced by the signal splitters/combiners 422a and 422b.

Modifications, additions, or omissions may be made to the signal booster 402 without departing from the scope of the present disclosure. For example, as mentioned above, in some embodiments, the signal booster 402 may be configured to amplify signals communicated in a different first downlink band included in a different first communication band, a different second downlink band included in a different second communication band, and also signals communicated in spectrally adjacent different first and second uplink bands included in the different first communication band and the different second communication band, respectively. In these embodiments, the downlink path of the signal booster 402 may accordingly be configured with common-direction duplexers and different amplifier chains for the different downlink bands similarly to the uplink path 404 of FIG. 4. Further, in some of these embodiments, the uplink path may accordingly be configured with BPF's similarly to the downlink path 406 of FIG. 4.

Further, the use of a signal splitter/combiner to provide isolation with respect to circuits is not limited to the specific implementation of the signal booster 402 illustrated. For example, signal splitters/combiners may be used to isolate other downlink and uplink paths than those specifically illustrated, including downlink and uplink paths that may not include common-direction duplexers and/or BPFs.

Nor is the use of a signal splitter/combiner to provide isolation in the manner depicted limited to duplexing or wireless communication applications. A signal splitter/combiner, such as the signal splitters/combiners 422a and 422b, may be used to provide isolation between filters in any other appropriate circuit to reduce the roll off requirements of the filters. For example, in some embodiments, a signal splitter/combiner, such as the signal splitter/combiner 422a or the signal splitter/combiner 422b, may be used to provide isolation between two conventional duplexers that may include filters such that the signal splitter/combiner may isolate and reduce the roll off requirements of the duplexers and their associated filters. Additionally, a signal splitter/combiner, such as the signal splitter/combiner 422a or the signal splitter/combiner 422b, may be used to provide isolation and/or impedance matching between any other appropriate circuits to improve performance of the circuits. For example, in some embodiments, a signal splitter/combiner may be used to provide isolation between two circulators that may not necessarily perform filtering but that may be configured as duplexers to direct uplink and downlink signals to their desired paths.

Figure 5:
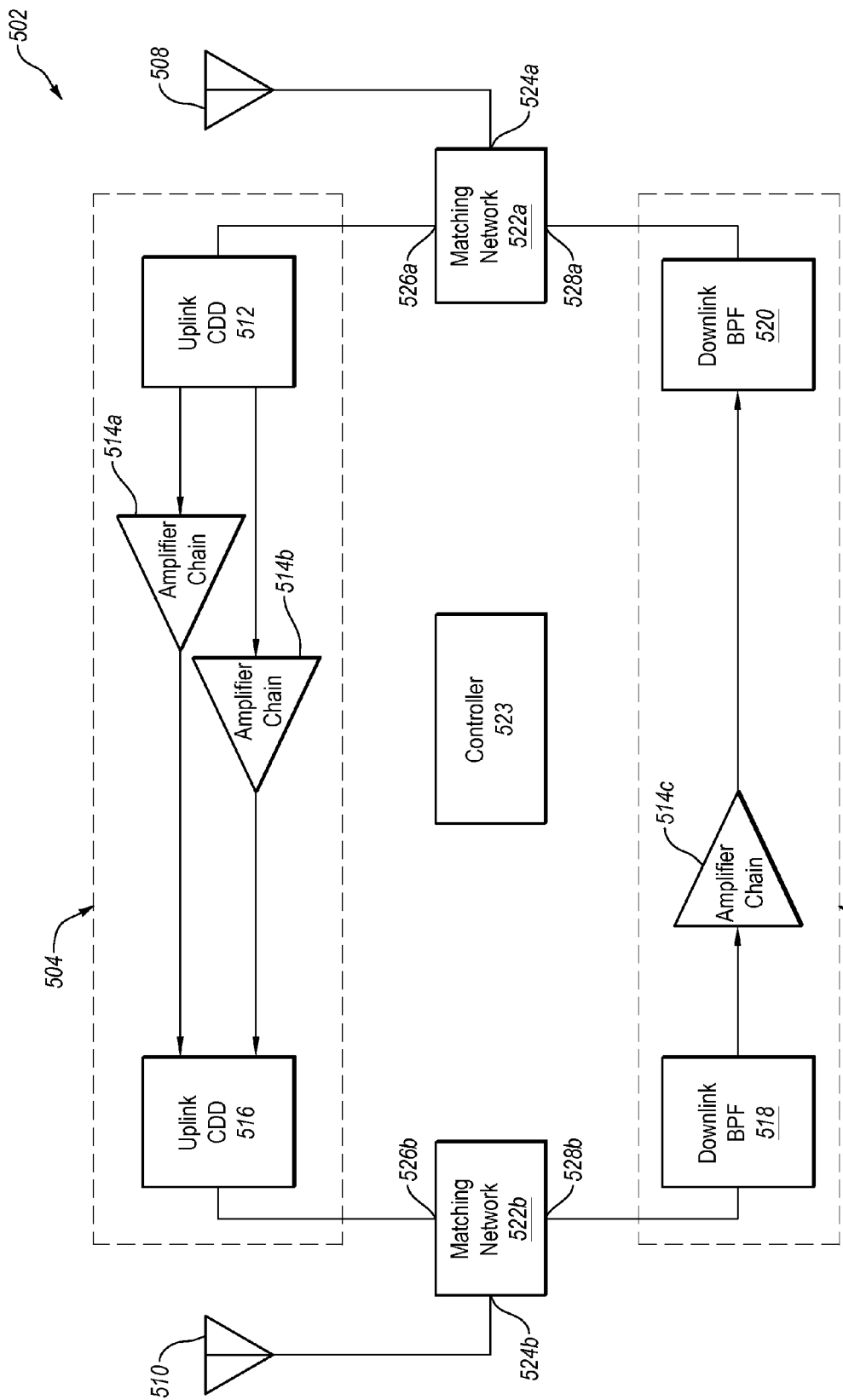

FIG. 5 illustrates an example embodiment of a signal booster 502, in accordance with some embodiments described herein. In some embodiments, the signal booster 502 may be configured to operate in a manner analogous to the operation of the signal booster 202 of FIG. 2. Additionally, in the illustrated embodiment, the signal booster 502 may include a controller 523, a first antenna 508, a second antenna 510, an uplink path 504, and a downlink path 506 substantially similar to the controller 323, the first antenna 308, the second antenna 310, the uplink path 304, and the downlink path 306, respectively, of the signal booster 302 of FIG. 3.

Therefore, the uplink path 504 may include an uplink CDD 512, amplifier chains 514a and 514b, and an uplink CDD 516 substantially similar to the uplink CDD 312, amplifier chains 314a and 314b, and the uplink CDD 316 of FIG. 3. Further, the downlink path 506 may include a downlink BPF 518, an amplifier chain 514c, and a downlink BPF 520 substantially similar to the downlink BPF 318, the amplifier chain 314c, and the downlink BPF 320 of FIG. 3. However, unlike the signal booster 302 of FIG. 3, the signal booster 502 may also include matching networks 522a and 522b.

The matching network 522a may include a first interface 524a, a second interface 526a, and a third interface 528a. The matching network 522b may similarly include a first interface 524b, a second interface 526b, and a third interface 528b. The matching network 522a may be configured such that the first interface 524a is communicatively coupled to and substantially impedance matched with the first antenna 508, the second interface 526a is communicatively coupled to and substantially impedance matched with the uplink path 504, and the third interface 528a is communicatively coupled to and substantially impedance matched with the downlink path 506. Additionally, the matching circuit 522b may be configured such that the first interface 524b is communicatively coupled to and substantially impedance matched with the second antenna 510, the second interface 526b is communicatively coupled to and substantially impedance matched with the uplink path 504, and the third interface 528b is communicatively coupled to and substantially impedance matched with the downlink path 506.

As mentioned above, impedance matching may reduce standing waves such that the matching networks 522a and 522b may reduce the incidence of standing waves between the uplink path 504 and the downlink path 506, which may provide additional signal isolation between the uplink path 504 and the downlink path 506. The matching networks 522a and 522b may be any suitable matching network and may be capacitive and/or inductive.

Modifications, additions, or omissions may be made to the signal booster 502 without departing from the scope of the present disclosure. For example, as mentioned above, in some embodiments, the signal booster 502 may be configured to amplify signals communicated in a different first downlink band included in a different first communication band, a different second downlink band included in a different second communication band, and also signals communicated in spectrally adjacent different first and second uplink bands included in the different first communication band and the different second communication band, respectively. In these embodiments, the downlink path of the signal booster 502 may accordingly be configured with common-direction duplexers and different amplifier chains for the different downlink bands similarly to the uplink path 504 of FIG. 5. Further, in some of these embodiments, the uplink path may accordingly be configured with BPF's similarly to the downlink path 506 of FIG. 5.

Figure 6:
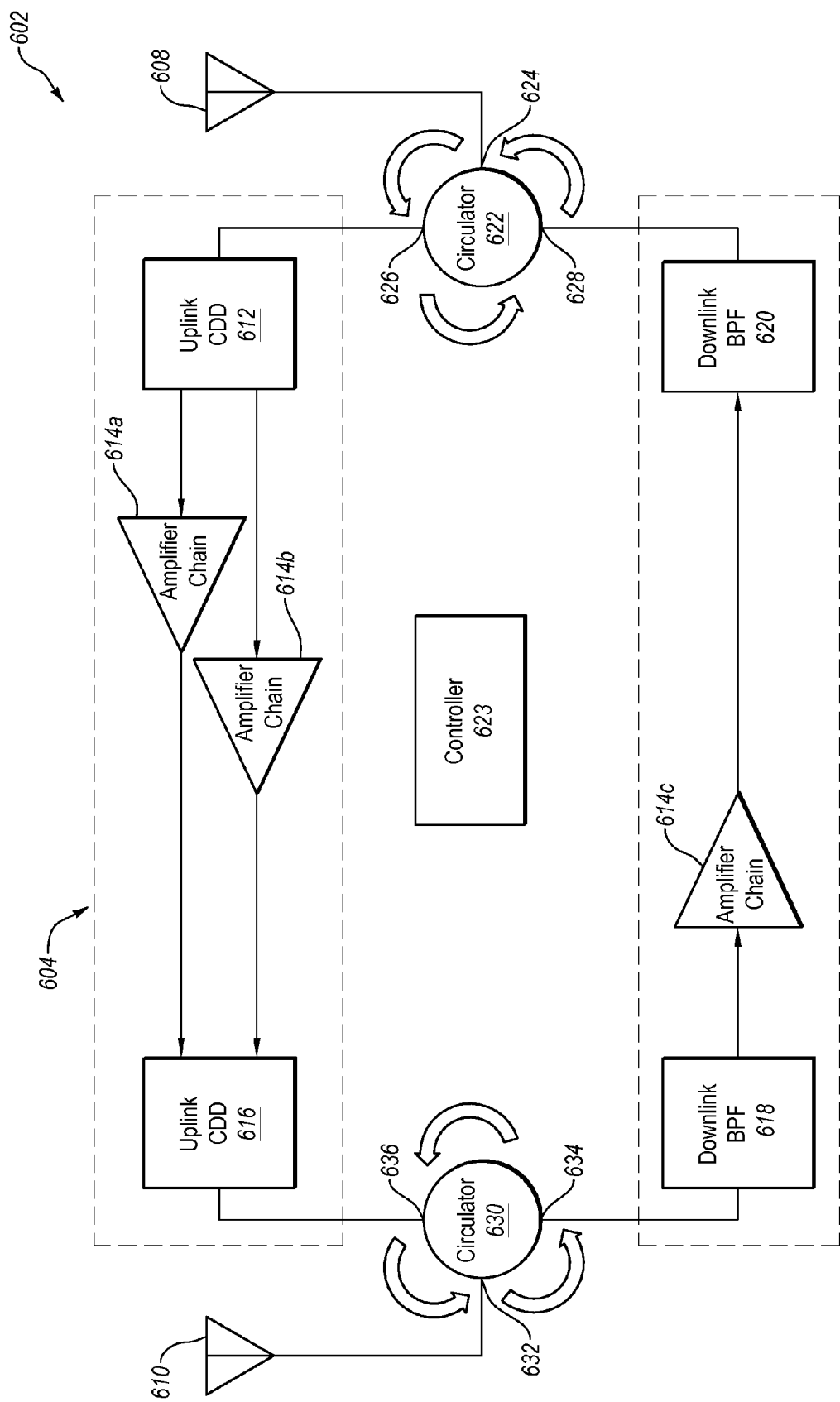

FIG. 6 illustrates an example embodiment of a signal booster 602, in accordance with some embodiments described herein. In some embodiments, the signal booster 602 may be configured to operate in a manner analogous to the operation of the signal booster 202 of FIG. 2. Additionally, in the illustrated embodiment, the signal booster 602 may include a controller 623, a first antenna 608, a second antenna 610, an uplink path 604, and a downlink path 606 substantially similar to the controller 323, the first antenna 308, the second antenna 310, the uplink path 304, and the downlink path 306, respectively, of the signal booster 302 of FIG. 3.

Therefore, the uplink path 604 may include an uplink CDD 612, amplifier chains 614a and 614b, and an uplink CDD 616 substantially similar to the uplink CDD 312, amplifier chains 314a and 314b, and the uplink CDD 316 of FIG. 3. Further, the downlink path 606 may include a downlink BPF 618, an amplifier chain 614c, and a downlink BPF 620 substantially similar to the downlink BPF 318, the amplifier chain 314c, and the downlink BPF 320 of FIG. 3. However, unlike the signal booster 302 of FIG. 3, the signal booster 602 may also include circulators 622 and 630.

The circulators 622 and 630 may provide additional signal isolation than that provided by the uplink CDDs 612 and 616 and the downlink BPFs 618 and 620 to further reduce downlink signals interfering with uplink signals and vice versa. The circulators 622 and 630 may direct signals received at their ports to be output at other ports to help reduce the occurrence of downlink signals being transmitted in or interfering with the uplink path 604 and may also help reduce the occurrence of uplink signals being transmitted in or interfering with the downlink path 606.

For example, the circulator 622 may include a first port 624, a second port 626, and a third port 628. The first port 624 may be communicatively coupled to the first antenna 608, the second port 626 may be communicatively coupled to the uplink path 604, and the third port 628 may be communicatively coupled to the downlink path 606. The circulator 622 may be configured such that a signal received at the first port 624 is directed to be output at the second port 626, a signal received at the second port 626 is directed to be output at the third port 628, and a signal received at the third port 628 is directed to be output at the first port 624. Therefore, upon receiving an uplink signal at the first port 624 from the first antenna 608, the circulator 622 may direct the uplink signal toward the second port 626 and away from the third port 628. Accordingly, the circulator 622 may direct the uplink signal toward the uplink CDD 612 of the uplink path 604 and away from the downlink BPF 620 of the downlink path 606.

Additionally, upon receiving a downlink signal at the third port 628 from the downlink BPF 620, the circulator 622 may direct the downlink signal toward the first port 624 and away from the second port 626. Accordingly, the circulator 622 may direct the downlink signal from the downlink BPF 620 of the downlink path 606 toward the first antenna 608 and away from the uplink CDD 612 of the uplink path 604. Therefore, the circulator 622 may provide isolation (e.g., between 10-30 dB) between the uplink CDD 612 (and its associated filters) and the downlink BPF 620 to provide further isolation between the uplink path 604 and the downlink path 606.

The circulator 630 may be similarly configured and may include a first port 632, a second port 634, and a third port 636. The first port 632 may be communicatively coupled to the second antenna 610, the second port 634 may be communicatively coupled to the downlink path 606, and the third port 636 may be communicatively coupled to the uplink path 604. The circulator 630 may be configured such that a signal received at the first port 632 is directed to be output at the second port 634, a signal received at the second port 634 is directed to be output at the third port 636, and a signal received at the third port 636 is directed to be output at the first port 632. Therefore, upon receiving a downlink signal at the first port 632 from the second antenna 610, the circulator 630 may direct the downlink signal toward the second port 634 and away from the third port 636. Accordingly, the circulator 630 may direct the downlink signal toward the downlink BPF 618 of the downlink path 606 and away from the uplink CDD 616 of the uplink path 604.

Additionally, upon receiving an uplink signal at the third port 636 from the uplink CDD 616, the circulator 630 may direct the uplink signal toward the first port 632 and away from the second port 634. Accordingly, the circulator 630 may direct the uplink signal from the uplink CDD 616 of the uplink path 604 toward the second antenna 610 and away from the downlink BPF 618 of the downlink path 606. Therefore, the circulator 630 may provide isolation between the uplink CDD 616 (and its associated filters) and the downlink BPF 618 to further isolate the uplink path 604 and the downlink path 606.

Further, in some embodiments, the circulator 622 may be configured such that the first port 624 may be substantially impedance matched with the first antenna 608, the second port 626 may be substantially impedance matched with the uplink path 604 and the third port 628 may be substantially impedance matched with the downlink path 606. Additionally, the circulator 630 may be configured such that the first port 632 may be substantially impedance matched with the second antenna 610, the second port 634 may be substantially impedance matched with the downlink path 606 and the third port 636 may be substantially impedance matched with the uplink path 604. Additionally, although the power circulators 622 and 630 may be configured to direct signals a certain direction, substantially high signal power at the ports (e.g., caused by standing waves) may result in not all of the signals being directed in the intended manner. Therefore, the incidence of standing waves may be reduced by the impedance matching, which may reduce the power of the signals received at the respective ports and thus improve isolation between the uplink path 604 and the downlink path 606.

In some embodiments, as with the signal splitters/combiners 422a and 422b of FIG. 4, the circulators 622 and 630 may be configured as isolators to reduce the roll off requirements of the filters associated with the uplink CDDs 612 and 616 and the downlink BPFs 618 and 620. For example, as described above with respect to the signal splitters/combiners 422a and 422b, in some instances the guard bands between the uplink and downlink bands of the uplink and downlink signals amplified by the signal booster 602 may be relatively narrow. Therefore, without the circulators 622 and 630, in order to adequately filter out the downlink signals, the filters of the uplink CDDs 612 and 616 may need to have a relatively steep roll off, which may add considerable cost. Similarly, without the circulators 622 and 630, in order to adequately filter out the uplink signals, the filters of the downlink BPFs 618 and 620 may also need to have a relatively steep roll off, which may also add more cost.

However, by adding the circulators 622 and 630 as isolators, the roll off requirements of the filters associated with the uplink CDDs 612 and 616 and the downlink BPFs 618 and 620 may be reduced because the occurrence and/or power level of uplink signals received by the downlink BPFs 618 and 620 and the occurrence and/or power level of downlink signals received by the uplink CDDs 612 and 616 may be substantially reduced by the circulators 622 and 630.

Modifications, additions, or omissions may be made to the signal booster 602 without departing from the scope of the present disclosure. For example, in some embodiments, the circulator 622 and/or the circulator 630 may include a fourth port between their respective second and third ports. In these embodiments, and in accordance with the directionality of the circulators 622 and 630, signals received at the respective second ports of the circulators 622 and 630 may be directed toward their respective fourth ports and signals received at the respective fourth ports of the circulators 622 and 630 may be directed toward their respective third ports. In these embodiments, a load (e.g., a resistor) may be coupled between the fourth port and ground. Therefore, any signals that may be received at the respective second ports of the circulators 622 and 630 may be sent to their respective fourth ports and may be grounded. Thus, isolation between the respective second and third ports of the circulators 622 and 630 may be further increased.

Additionally, in some embodiments, the signal booster 602 may be configured to amplify signals communicated in a different first downlink band included in a different first communication band, a different second downlink band included in a different second communication band, and also signals communicated in spectrally adjacent different first and second uplink bands included in the different first communication band and the different second communication band, respectively. In these embodiments, the downlink path of the signal booster 602 may accordingly be configured with common-direction duplexers and different amplifier chains for the different downlink bands similarly to the uplink path 604 of FIG. 6. Further, in some of these embodiments, the uplink path may accordingly be configured with BPF's similarly to the downlink path 606 of FIG. 6.

Further, the use of a circulator to provide isolation with respect to circuits is not limited to the specific implementation of the signal booster 602 illustrated. Nor is the use of a circulator to provide isolation in the manner depicted limited to wireless communication applications. A circulator, such as the circulators 622 and 630, may be used to provide isolation between filters in any other appropriate circuit to reduce the roll off requirements of the filters. Additionally, a circulator, such as the circulator 622 or the circulator 630, may be used to provide isolation between any other appropriate circuits to improve performance of the circuits.

Figure 7:
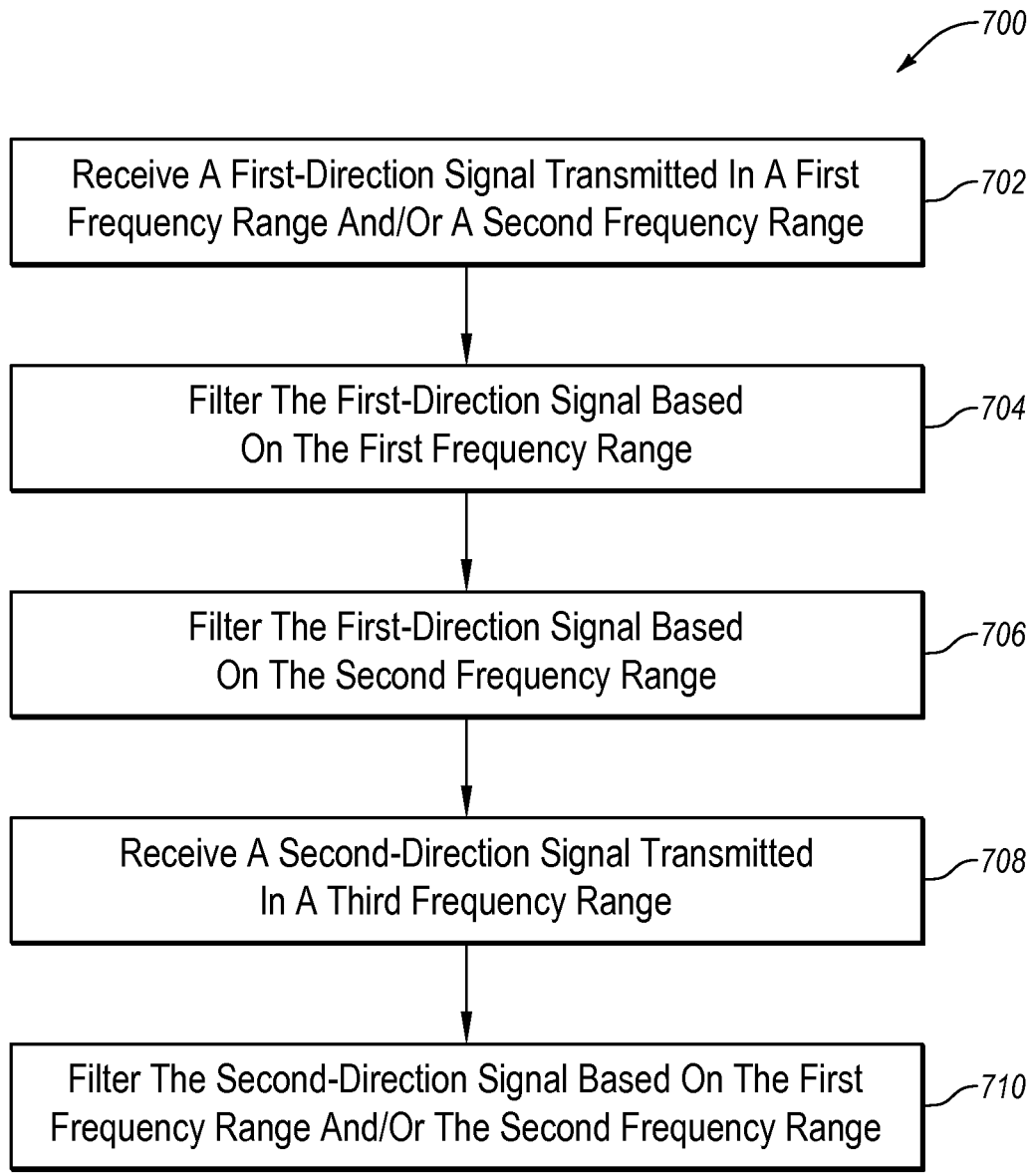
FIG. 7 is a flow chart of an example method of processing a signal.

FIG. 7 is a flow chart of an example method 700 of processing signals, arranged in accordance with at least some embodiments described herein. One or more elements of the method 700 may be implemented, in some embodiments, by a common-direction duplexer, such as the common-direction duplexer 102 of FIG. 1. Additionally, one or more elements of method 700 may be implemented, in some embodiments, by a signal booster, such as signal boosters 302, 402, 502, and 602 of FIGS. 3, 4, 5, and 6, respectively. Although illustrated as discrete blocks, various blocks may be divided into additional blocks, combined into fewer blocks, or eliminated, depending on the desired implementation.

The method 700 may begin at block 702, where a first-direction signal transmitted in at least one of a first frequency range and a second frequency range may be received, by for example, a common-direction duplexer. In some embodiments, the first frequency range and the second frequency range may be associated with a first uplink band and a second uplink band, respectively. In other embodiments, the first frequency range and the second frequency range may be associated with a first downlink band and a second downlink band, respectively.

At block 704, the first-direction signal may be filtered based on the first frequency range to pass the first frequency-range of the first-direction signal and filter out the second frequency range of the first-direction signal such that a first-frequency-range signal is produced. At block 706, the first-direction signal may be filtered based on the second frequency range to pass the second frequency range of the first-direction signal and filter out the first frequency range of the first-direction signal such that a second-frequency-range signal is produced.

At block 708, a second-direction signal transmitted in a third frequency range may be received (e.g., by the common-direction duplexer). The third frequency range may be spectrally between the first frequency range and the second frequency range and the second-direction signal may propagate in a direction opposite that of the first-direction signal. For example, if the first-direction signal is an uplink signal, the second-direction signal may be a downlink signal, or vice versa. Additionally, the third frequency range may include bands that may be associated with one or more communication bands, but that may also be spectrally adjacent. For example, the third frequency range may include the band 12 and band 13 downlink bands or may include the 700 MHz and 800 MHz public safety uplink bands.

At block 710, the second-direction signal may be filtered based on the first frequency range and/or the second frequency range such that the third frequency range of the second-direction signal may be filtered out. Therefore, the second-direction signal may be substantially attenuated.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the method 700 may further include steps associated with amplifying the first-direction signal and/or the second-direction signal and transmitting at least one of the first-direction signal and the second-direction signal. Additionally, in some embodiments, the first-direction signal and second-direction signal may be filtered (e.g., by a BPF) based on the third frequency range such that the third frequency range may pass through the filtering and the first frequency range and the second frequency range may be filtered out. Therefore, the second-direction signal may pass through the filtering and the first-direction signal may be filtered out.

Figure 8:
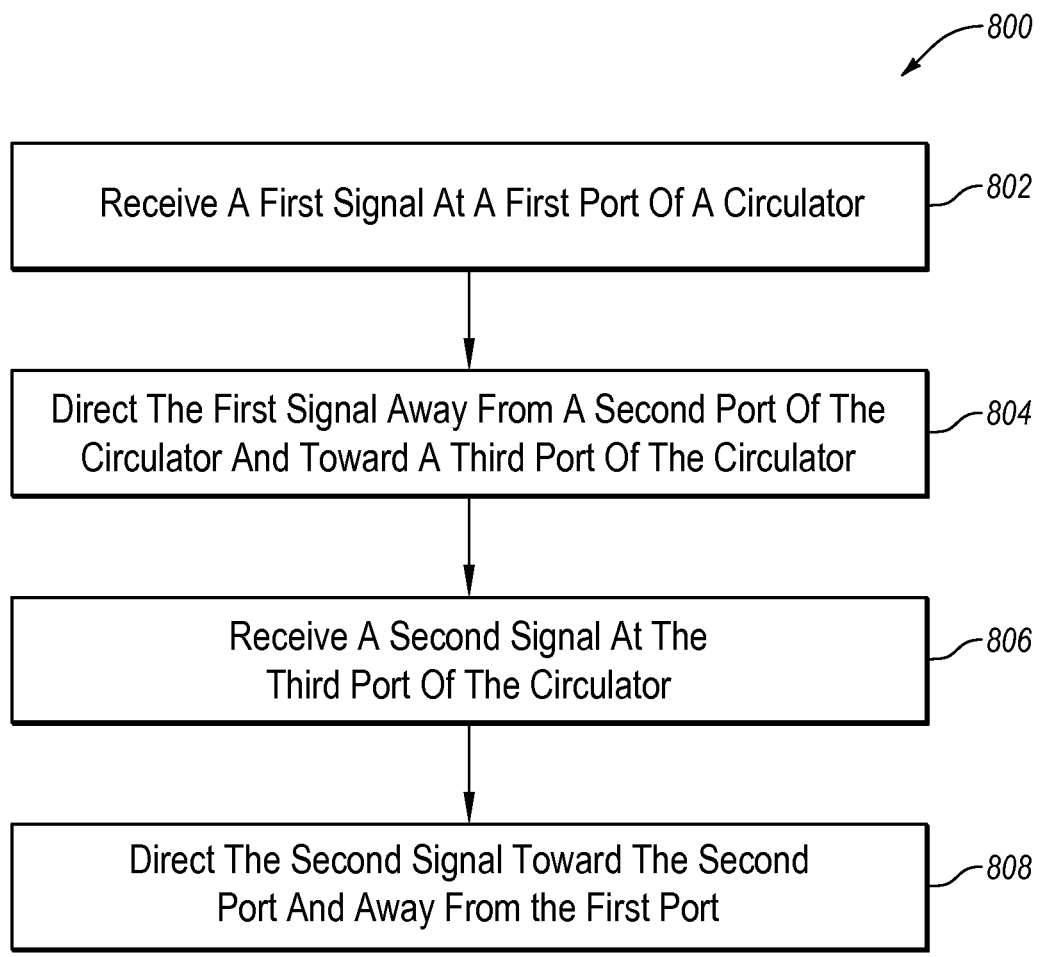
FIG. 8 is a flow chart of an example method of providing isolation between filters

FIG. 8 is a flow chart of an example method 800 of providing isolation between filters, arranged in accordance with at least some embodiments described herein. One or more elements of the method 800 may be implemented, in some embodiments, by a circulator, such as the circulators 622 and 636 of FIG. 6. Although illustrated as discrete blocks, various blocks may be divided into additional blocks, combined into fewer blocks, or eliminated, depending on the desired implementation.

The method 800 may begin at block 802, where a circulator may receive a first signal at a first port of the circulator. The first port may be communicatively coupled to a first filter such that the first signal may be received from the first filter. At block 804, the circulator may direct the first signal received at the first port away from a second port of the circulator and toward a third port of the circulator. The second port may be communicatively coupled to a second filter such that the circulator may direct the first signal away from the second filter at block 804.

At block 806, the circulator may receive a second signal at the third port of the circulator. In some embodiments, the third port may be communicatively coupled to an antenna such that the circulator may receive the second signal from the antenna. At block 808, the circulator may direct the second signal received at the third port to the second port and away from the first port. Therefore, the circulator may direct the second signal toward the second filter and away from the first filter.

Accordingly, the method 800 may be used to provide isolation between filters via a circulator. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the invention.

What is claimed is:
1. A common-direction duplexer comprising:
   a common port;
   a first-band port;
   a second-band port;
   a first filter communicatively coupled between the common port and the first-band port, the first filter configured to pass a first frequency range and filter out a second frequency range and a third frequency range,
      the first frequency range including a first uplink band associated with Band 12 of a 700 Megahertz (MHz) Third Generation Partnership Project (3GPP) standard,
      the second frequency range including a second uplink band associated with Band 13 of the 700 MHz 3GPP standard, and
      the third frequency range being spectrally between the first frequency range and the second frequency range and including a first downlink band and a second downlink band, the first downlink band being associated with Band 12 of the 700 MHz 3GPP standard and the second downlink band being associated with Band 13 of the 700 MHz 3GPP standard; and
   a second filter communicatively coupled between the common port and the second-band port, the second filter configured to pass the second frequency range and filter out the first frequency range and the third frequency range.

2. The common-direction duplexer of claim 1, further comprising:
   a third-band port; and
   a third filter communicatively coupled between the common port and the third-band port, the third filter configured to pass the third frequency range and filter out the first frequency range and the second frequency range.

3. A signal booster comprising:
   a first interface port configured to receive a first-direction signal transmitted in at least one of a first frequency range and a second frequency range;
   a second interface port configured to receive a second-direction signal transmitted in a third frequency range spectrally between the first frequency range and the second frequency range, the second-direction signal propagating in a direction opposite that of a propagation direction of the first-direction signal;
   a first-direction path communicatively coupled between the first interface port and the second interface port and configured to communicate the first-direction signal from the first interface port toward the second interface port, the first-direction path including:
      a common-direction duplexer configured to pass the first-direction signal based on the first frequency range and the second frequency range such that the common-direction duplexer outputs at least one of a first-frequency-range signal and a second-frequency-range signal, the first-frequency-range signal being associated with the first frequency range and the second-frequency-range signal being associated with the second frequency range, the common-direction duplexer further configured to filter out the third frequency range;
      a first amplifier configured to amplify the first-frequency-range signal and communicate the amplified first-frequency-range signal toward the second interface port; and
      a second amplifier configured to amplify the second-frequency-range signal and communicate the amplified second-frequency-range signal toward the second interface port; and
   a second-direction path communicatively coupled between the second interface port and the first interface port and configured to communicate the second-direction signal from the second interface port toward the first interface port, the second-direction path including:
      a band pass filter configured to filter the second-direction signal based on the third frequency range such that the second-direction signal passes through the band pass filter, the band pass filter being further configured to filter out the first frequency range and the second frequency range; and
      a third amplifier configured to amplify the second-direction signal filtered by the band pass filter, the third amplifier further configured to communicate the amplified second-direction signal toward the first interface port.

4. The signal booster of claim 3, further comprising another common-direction duplexer configured to receive the first-frequency-range signal amplified by the first amplifier and the second-frequency-range signal amplified by the second amplifier and further configured to communicate the first-frequency-range signal and the second-frequency-range signal toward the second interface port.

5. The signal booster of claim 3, further comprising at least one of a signal splitter/combiner, a matching network, and a circulator configured to provide isolation between the common-direction duplexer and the band pass filter.

6. The signal booster of claim 3, wherein:
the first frequency range includes a first uplink band associated with uplink communications between a wireless device and an access point of a wireless communication system;
the second frequency range includes a second uplink band associated with the uplink communications between the wireless device and the access point; and
the third frequency range includes a first downlink band and a second downlink band associated with downlink communications between the wireless device and the access point.

7. The signal booster of claim 6, wherein:
the first uplink band and the first downlink band are associated with Band 12 of a 700 Megahertz (MHz) Third Generation Partnership Project (3GPP) standard; and
the second uplink band and the second downlink band are associated with Band 13 of the 700 MHz 3GPP standard.

8. The signal booster of claim 3, wherein:
the first frequency range includes a first downlink band associated with downlink communications between a wireless device and an access point of a wireless communication system;
the second frequency range includes a second downlink band associated with the downlink communications between the wireless device and the access point; and
the third frequency range includes a first uplink band and a second uplink band associated with uplink communications between the wireless device and the access point.

9. The signal booster of claim 8, wherein:
the first uplink band and the first downlink band are associated with a 700 Megahertz public safety band; and
the second uplink band and the second downlink band are associated with an 800 Megahertz public safety band.

10. A method of processing a signal comprising:
receiving a first-direction signal transmitted in at least one of a first frequency range and a second frequency range, the first frequency range including a first uplink band associated with Band 12 of a 700 Megahertz (MHz) Third Generation Partnership Project (3GPP) standard and the second frequency range including a second uplink band associated with Band 13 of the 700 MHz 3GPP standard;
filtering the first-direction signal based on the first frequency range to pass the first frequency range of the first-direction signal and filter out the second frequency range of the first-direction signal such that a first-frequency-range signal is produced when the first-direction signal is transmitted in the first frequency range;
filtering the first-direction signal based on the second frequency range to pass the second frequency range of the first-direction signal and filter out the first frequency range of the first-direction signal such that a second-frequency-range signal is produced when the first-direction signal is transmitted in the second frequency range;
receiving a second-direction signal transmitted in a third frequency range that is outside of and spectrally between the first frequency range and the second frequency range, the third frequency range including a first downlink band and a second downlink band, the first downlink band being associated with Band 12 of the 700 MHz 3GPP standard and the second downlink band being associated with Band 13 of the 700 MHz 3GPP standard, the second-direction signal propagating in a direction opposite that of the first-direction signal; and
filtering the second-direction signal based on at least one of the first frequency range and the second frequency range such that the second-direction signal is filtered out due to the second-direction signal being transmitted in the third frequency range.

11. The method of claim 10, further comprising amplifying the first-frequency-range signal and the second-frequency-range signal and transmitting the amplified first-frequency-range signal and the amplified second-frequency-range signal.

12. The method of claim 10, further comprising:
filtering the first-direction signal and the second-direction signal based on the third frequency range to pass the second-direction signal and filter out the first-direction signal; and
transmitting the second-direction signal after filtering the second-direction signal.

* * * * *